US012737299B2

(12) United States Patent
Narayanan et al.

(10) Patent No.: US 12,737,299 B2
(45) Date of Patent: Sep. 15, 2026

(54) FINE-GRAINED DIRTY PAGE TRACKING OF IOMMU SECOND-STAGE LARGE PAGES

(71) Applicant: Intel Corporation, Santa Clara, CA (US)

(72) Inventors: Karthik V. Narayanan, Chandler, AZ (US); Raghunathan Srinivasan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/080,951

(22) Filed: Dec. 14, 2022

(65) Prior Publication Data

US 2024/0202133 A1 Jun. 20, 2024

(51) Int. Cl.
*G06F 12/10* (2016.01)
*G06F 12/084* (2016.01)
*G06F 12/1009* (2016.01)

(52) U.S. Cl.
CPC ........ *G06F 12/1009* (2013.01); *G06F 12/084* (2013.01)

(58) Field of Classification Search
CPC .... G06F 12/1009; G06F 12/084; G06F 12/04; G06F 12/0804; G06F 13/28; G06F 2212/1016; G06F 2212/502; G06F 2212/651; G06F 2212/652; G06F 12/1081
See application file for complete search history.

(56) References Cited

U.S. PATENT DOCUMENTS

2006/0259735 A1* 11/2006 Anand ................ G06F 12/1027 711/205
2009/0182976 A1* 7/2009 Agesen ............... G06F 12/1009 711/E12.059
2012/0278525 A1* 11/2012 Serebrin ............. G06F 12/1027 711/6
2013/0024598 A1* 1/2013 Serebrin ............. G06F 12/1036 711/6
2015/0186220 A1* 7/2015 Serebrin ............. G06F 12/1018 711/162
2015/0199280 A1* 7/2015 Molnar ............... G06F 12/1009 711/207
2019/0278713 A1* 9/2019 Gandhi ............... G06F 12/1027
2023/0023229 A1* 1/2023 Kumar .................. G06F 3/0619

* cited by examiner

*Primary Examiner* — Kevin Verbrugge
(74) *Attorney, Agent, or Firm* — Essential Patents Group, LLP

(57) ABSTRACT

An example of an apparatus may include memory and an input/output (IO) bus, where an address space of the memory and the IO bus is at least partially organized as a plurality of large pages, and where a large page is organized as two or more sub-pages. In some examples, the apparatus further includes circuitry coupled to the memory and the IO bus to map an IO address to a physical address, and track a modification to a large page at a granularity that corresponds to a size of a subset of the large page. Other embodiments are disclosed and claimed.

21 Claims, 17 Drawing Sheets

| Bits | Access | Default | Field | Description |
|---|---|---|---|---|
| 59 | RO | 1 | LPSS | 0 : Hardware does not support Shadowing of SS-PDPE and SS-PDE<br>1 : Hardware supports Shadowing of SS-PDPE and SS-PDE |

300

| 63 | 62 | 61 | … | 52 | 51 | … | HAW | HAW-1 | … | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|
| Ign | SB | Ignored | | | Rsvd | | | Address of Second-stage-PML4 table | | | Rsvd | Ign | | A | Rsvd | Ignored | | | | X | W | R | SS-PML5E |
| Ign | SB | Ignored | | | Rsvd | | | Address of Second-stage-page-directory-pointer table | | | Rsvd | Ign | | A | Rsvd | Ignored | | | | X | W | R | SS-PML4E |
| Ign | SB | Ignored | | | Rsvd | | | Address of 1GB page frame | Rsvd | | SNP | Ign | D | A | 1 | IPAT | EMT | | | X | W | R | SS-PDPE: 1GB page |
| Ign | SB | Ignored | | | Rsvd | | | Address of Second-stage-page-directory table | | | Rsvd | Ign | | A | 0 | Ignored | | | | X | W | R | SS-PDPE: page directory |
| Ign | SB | Ignored | | | Rsvd | | | Address of 2MB page frame | Rsvd | | SNP | Ign | D | A | 1 | IPAT | EMT | | | X | W | R | SS-PDE: 2 MB page |
| Ign | SB | Ignored | | | Rsvd | | | Address of Second-stage-page table | | | Rsvd | Ign | | A | 0 | Ignored | | | | X | W | R | SS-PDE: page table |
| Ign | SB | Ignored | | | Rsvd | | | Address of 4KB page frame | | | SNP | Ign | D | A | Ign | IPAT | EMT | | | X | W | R | SS-PTE: 4KB page |

FIG. 3

410
Shadow
RsvdZ
Ignored
Addr of 1GB page frame
HAW
HAW-1
EMT
XWR

420
Addr of 2MB page frame

430
Addr of 4KB page frame

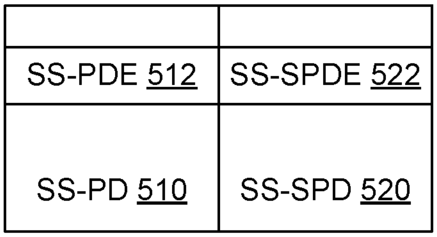
FIG. 5A
FIG. 5B
| Bits | Field | Description |
|---|---|---|
| 63:0 | D4K | This is a 64-bit field.<br>Each bit field indicates a range of dirty 4K pages.<br>0: Indicated range of 4K pages are not dirty<br>1: Indicated range of 4K pages are dirty<br>Hardware sets this field, and software clears this field |
FIG. 5C
| Bit Field Set | Range of Dirtied 4K Pages (Of a 2MB Page) |
|---|---|
| 0 | 0 - 7 |
| 1 | 8 - 15 |
| 2 | 16 - 23 |
| 3 | 24 - 31 |
| .... | ..... |
| 62 | 496 - 503 |
| 63 | 504 - 511 |
FIG. 5D

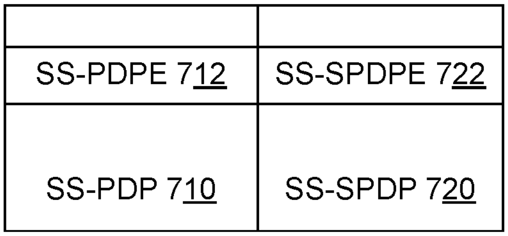
FIG. 7A
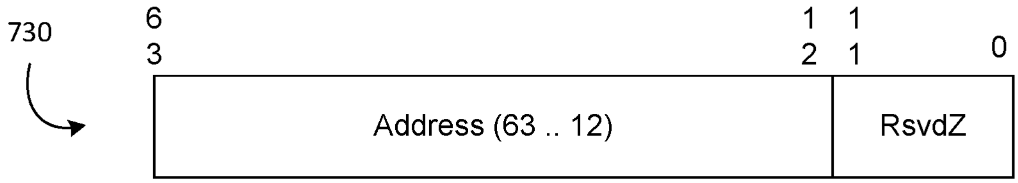
FIG. 7B
| Bits | Field | Description |
|---|---|---|
| 11:0 | RsvdZ | Reserved (0) |
| 63:12 | Addr | 4KB aligned Host physical address of page used as bit-fields |
FIG. 7C
740
| Bit Field Set | Range of Dirtied 4K Pages (Of a 1GB Page) |
|---|---|
| 0 | 0 - 63 |
| 1 | 64 - 127 |
| 2 | 128 – 191 |
| 3 | 192 - 255 |
| …. | ….. |
| 4094 | 262016 - 262079 |
| 4095 | 262080 - 262143 |
FIG. 7D

FINE-GRAINED DIRTY PAGE TRACKING OF IOMMU SECOND-STAGE LARGE PAGES

BACKGROUND

An input/output (IO) memory management unit (IOMMU) connects direct memory access (DMA) capable IO buses to system memory (e.g., main memory). A central processor unit (CPU) memory management (MMU) translates CPU-visible virtual addresses to physical addresses. An IOMMU brokers any DMA request on behalf of an IO device, translating IO virtual addresses much the same way as the processor MMU complex performs translation of a virtual address to physical address. There is an ongoing need for improved computational devices to enable ever increasing demand for modeling complex systems, providing reduced computation times, and other considerations. In particular, there is an ongoing desire to improve memory management circuits that are included in or otherwise support operation of integrated circuits. It is with respect to these and other considerations that the present improvements have been needed. Such improvements may become critical as the desire to improve computational efficiency become even more widespread.

BRIEF DESCRIPTION OF DRAWINGS

Various examples in accordance with the present disclosure will be described with reference to the drawings, in which:

FIG. 3 is an illustrative diagram of an example of a paging structure that supports finer-grained dirty page tracking for a large page in one implementation.

FIGS. 5A to 5D show illustrative examples of second-stage shadow page structures in accordance with some implementations.

FIGS. 7A to 7D show further illustrative examples of second-stage shadow page structures in accordance with some implementations.

DETAILED DESCRIPTION

Figure 1A:
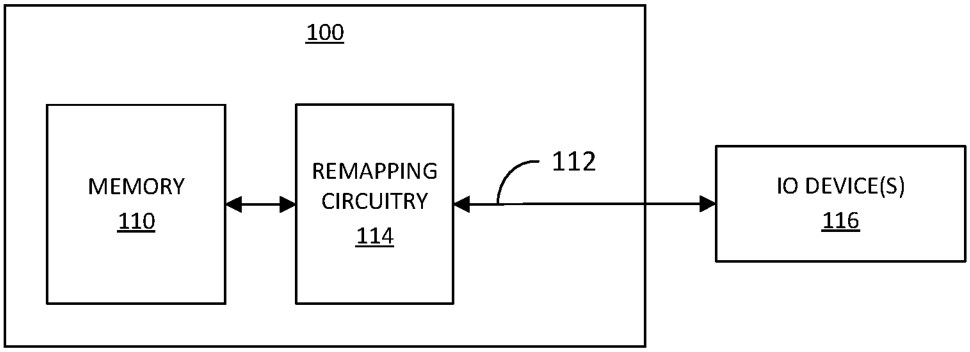
FIG. 1A is a block diagram of an example of an integrated circuit in one implementation.

The present disclosure relates to methods, apparatus, systems, and non-transitory computer-readable storage media for dirty page subset tracking of large pages. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to track subsets of dirty sub-pages of dirty large pages.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

An input/output memory management unit (IOMMU) may refer a memory management unit (MMU) that connects a direct-memory-access (DMA)-capable input/output (IO) bus to main/system memory. The MMU may translate central processor unit (CPU)-visible addresses (e.g., including virtual addresses) to physical addresses, while the IOMMU may map device-visible addresses (e.g., device addresses, virtual device addresses, IO addresses, virtual IO addresses, etc.) to physical addresses. Non-limiting examples of IOMMU technology include INTEL CORPORATION Virtualization Technology for Directed I/O (VT-d), a graphics address remapping table (GART), ADVANCED MICRO DEVICES (AMD) I/O Virtualization Technology (IOMMU) Specification 48882 (Rev 3.00, dated December 2016), AMD-VI, INTERNATIONAL BUSINESS MACHINES (IBM) Extended Control Program Support: Virtual Storage Extended (ECPS:VSE), IBM Translation Control Entry (TCE), SUN MICROSYSTEMS Device Virtual Memory Access (DVMA), Peripheral Component Interconnect Special Interest Group (PCI-SIG) I/O Virtualization (IOV) and Address Translation Services (ATS), and ARM System Memory Management Unit (SMMU).

A virtual machine (VM) may refer to a logical entity that is implemented over a hardware platform and operating system (OS). Each VM may operate independently of other VMs and yet utilize the same hardware resources. Live migration may refer to technology that allows migration of the active state of a VM from one physical host to another.

On hardware implementations supporting two stages of address translations, a first-stage translation may remap a virtual address to an intermediate (e.g., guest) physical address, and a second-stage translation may remap an intermediate physical address to a machine (e.g., host) physical address. In some implementations, a virtual machine monitor (VMM) or hypervisor may virtualize guest OS use of first-stage translations without shadowing page-tables, by configuring hardware to perform nested translation of first and second stages. The terms "stage" and "level" may be used interchangeably herein (e.g., second-level translation and second-stage translation have the same meaning).

To manage memory migration when using direct assigned devices, IOMMU hardware may track pages that were touched/modified by the device for second-stage paging structures. Some IOMMU implementations allow tracking dirty pages at large page (e.g., two megabytes (2 MB), one gigabyte (1 GB), etc.) granularity and four kilobyte (4 KB) granularity. For tracking at large page granularity, a problem is that software transmits a dirtied large page (e.g., of size 2 MB, 1 GB, etc.) in its entirety to the remote host even if only a subset of sub-pages (e.g., of size 4 KB) of the large page is actually dirtied. Transmitting the entire large page involves a large amount of data being migrated with consumption of corresponding large amounts of bandwidth, resources, migration time, and VM switch-over time (e.g., with corresponding performance impacts on latency and throughput).

Some examples described herein overcome one or more of the foregoing problems. Some examples provide technology to help track dirty large pages at a more fine-grained granularity (e.g., 4 KB, thirty-two kilobyte (32 KB), etc.) and enable software to transmit only a subset of the dirtied sub-pages (e.g., of size 4 KB, 32 KB, etc.), instead of transmitting the entire dirty large page (e.g., of size 2 MB, 1 GB, etc.). Advantageously, some examples may help to reduce VM migration time, switch-over time and data transmitted during live migration.

In some examples, IOMMU hardware may be configured to enable tracking at a fine-grained dirty page granularity (e.g., 4 KB, a range of 4 KB pages, etc.), for a dirtied large page. Examples of software and OS page allocation mechanism(s) may also include technology to enable utilization of the IOMMU hardware tracking at the fine-grained dirty page granularity for a dirtied large page.

The ability to seamlessly migrate VMs is an important part of most virtualization deployments. Advantageously, as compared to large page granularity (e.g., where the entire dirtied large page is transmitted during migration), some examples may speed-up VM live migration by reducing the migration time, VM switch-over time and data transmitted to the remote host. Some examples may also reduce a performance impact (e.g., latency, throughput, etc.) on applications running inside the VM during and after the migration.

Some examples may utilize software-based technology for page tracing to identify a subset of 4 KB pages dirtied in a large page. For example, large page backings can be broken down to new 4 KB mappings and IOMMU hardware can then track dirty pages at a 4 KB granularity on the source host. After the pages are transmitted to the destination host, the destination host may then reconstruct the large pages from the 4 KB mappings, matching the original large page backings. However, some software-based examples may have a high overhead and a complicated implementation. Also, breaking down the large pages on the source host and reconstructing the large pages on the destination host uses valuable CPU cycles that may slow down the live migration and VM switch-over time, depending on the number of large pages mapped/dirtied by the VM. In some implementations, hardware examples as described in further detail herein may be preferred to enable tracking at a fine-grained dirty page granularity for a dirtied large page.

With reference to FIG. 1A, an example of an integrated circuit (IC) 100 may include memory 110 and an input/output (IO) bus 112, where an address space of the memory 110 and the IO bus 112 is at least partially organized as a plurality of large pages, and where a large page is organized as two or more sub-pages. The IC 100 further includes remapping circuitry 114 (e.g., an IOMMU) coupled to the memory 110 and the IO bus 112 to map an IO address to a physical address, and track a modification to a large page at a granularity that corresponds to a size of a subset of the large page. The IC 100 may be further communicatively coupled to one or more IO devices 116 via the IO bus 112. For example, the circuitry 114 may be configured to selectively track the modification to the large page at a first granularity that corresponds to the size of the subset of the large page or a second granularity that corresponds to the size of the large page based on a configuration setting. In some examples, the circuitry 114 may be further configured to determine the configuration setting based on a field of a register (e.g., a configuration register).

In some examples, the circuitry 114 may be further configured to maintain a page table to map the IO address to the physical address, and maintain a shadow page table to track the modification to the large page at the granularity that corresponds to the size of the subset of the large page. For example, the shadow page table may be adjacent and physically contiguous to the page table. In some examples, the circuitry 114 may be configured to set a value of a field in a page table entry of the shadow page table to indicate a modification to a sub-page of the large page. For example, the field in the page table entry may correspond to a range of two or more sub-pages of the large page, where a size of the range corresponds to the size of the subset of the large page.

In some examples, the circuitry 114 may be further configured to maintain a shadow pointer table with an entry to point to the shadow page table. For example, the shadow pointer table may be adjacent and physically contiguous to the page table (e.g., and may point to other shadow page structures that stores fields that indicate modifications to subsets of the large pages).

Figure 15:
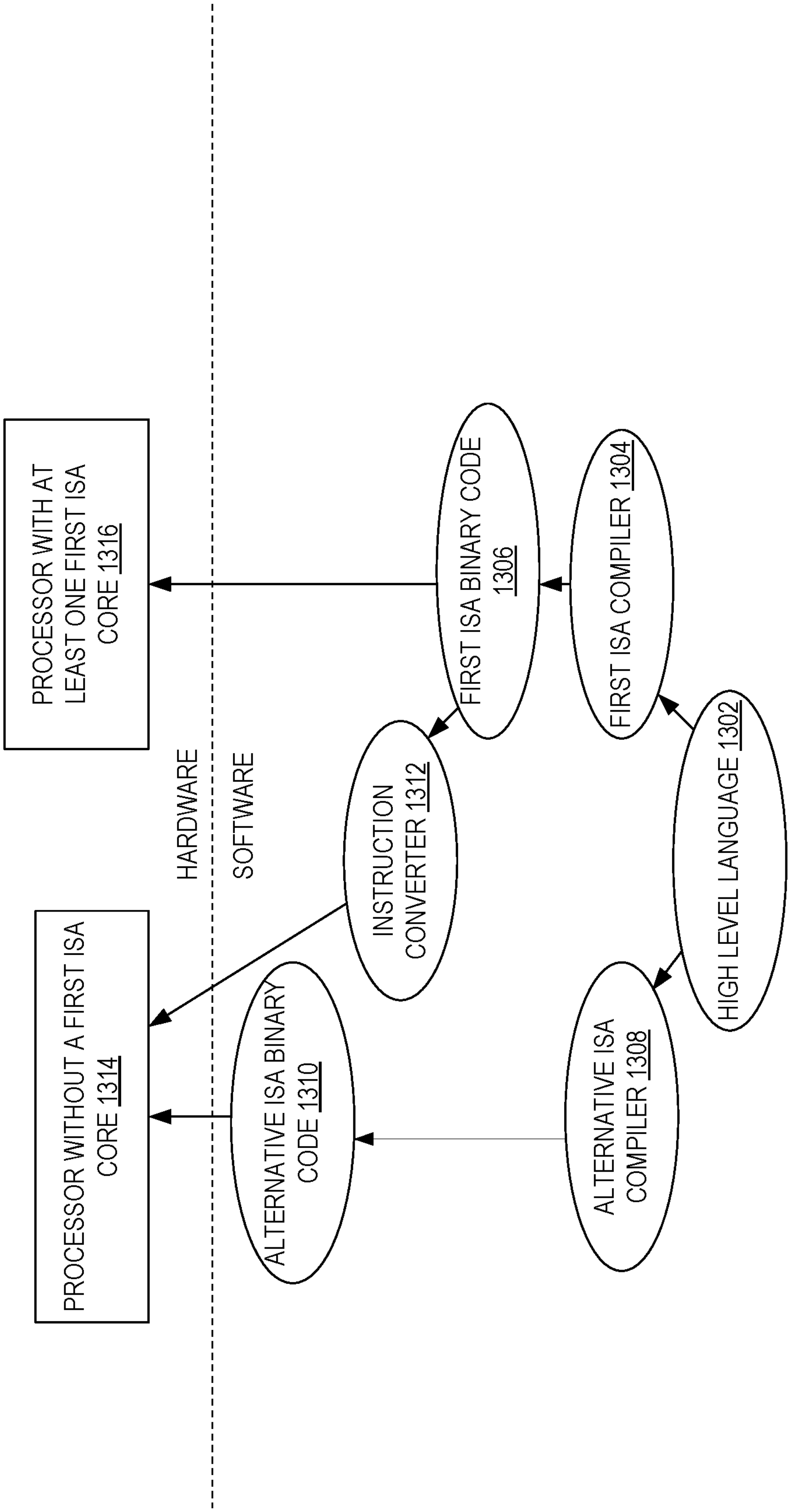
FIG. 15 is a block diagram illustrating the use of a software instruction converter to convert binary instructions in a source instruction set architecture to binary instructions in a target instruction set architecture according to examples.

For example, the circuitry 114 may be integrated/incorporated with/in any of the processors described herein. In particular, the circuitry 114 may be integrated/incorporated with/in the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15).

Figure 1B:
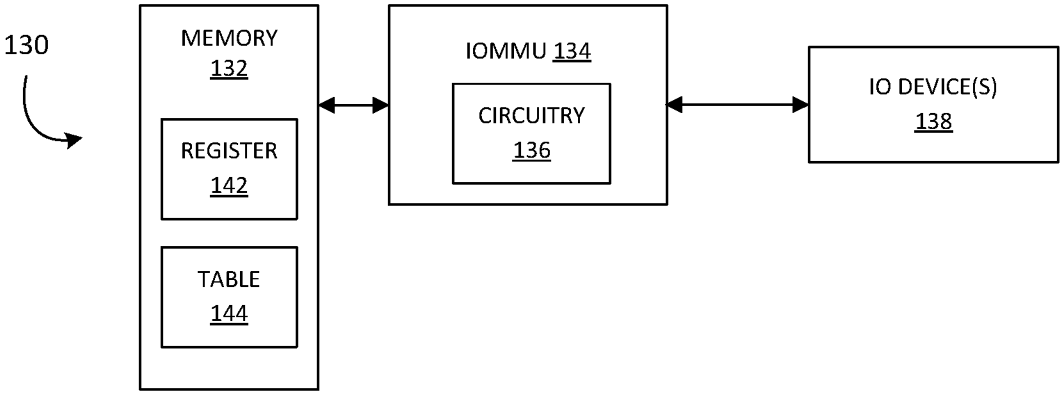
FIG. 1B is a block diagram of an example of an apparatus in one implementation.

With reference to FIG. 1B, an example of an apparatus 130 includes memory 132 and an IOMMU 134 coupled to the memory 132. The IOMMU 134 includes circuitry 136 to manage access from IO device(s) 138 to the memory 132 at a page level that includes at a higher-level page and a lower-level page (e.g., where a higher-level page includes a plurality of lower-level pages), and to selectively track higher-level dirty pages at a first granularity that corresponds to a first size of a higher-level page or at a second granularity that corresponds to a second size of a subset of the higher-level page. In some examples, the apparatus 130 further includes a register 142 (e.g., a configuration register) to store an indication of whether the circuitry 136 is to track higher-level dirty pages at the first granularity or the second granularity. For example, the circuitry 136 may be configured to determine if an IO device 138 modifies a higher-level page, and set a dirty bit in a shadow higher-level page table entry that corresponds to a modified subset of the modified higher-level page if the register 142 stores an indication that the circuitry 136 is to track higher-level dirty pages at the second granularity.

In some examples, the memory 132 stores a table 144 (e.g., a page table) with an indication of whether the first size of the higher-level page corresponds to a first large page size or a second large page size. For example, if the register 142 stores an indication that the circuitry 136 is to track higher-level dirty pages at the second granularity, the circuitry 136 may be further configured to utilize a shadow higher-level page structure that is adjacent to a higher-level page directory to store dirty bits that correspond to modified subsets of a higher-level page, if the table 144 stores an indication of that the first size of the higher-level page corresponds to the first large page size. Alternatively, if the register 142 stores an indication that the circuitry 136 is to track higher-level dirty pages at the second granularity, the circuitry 136 may be further configured to utilize a first shadow higher-level page structure that is adjacent to a higher-level page directory to store pointers to respective second shadow higher-level page structures that store dirty bits that correspond to modified subsets of a higher-level page, if the table 144 stores an indication of that the first size of the higher-level page corresponds to the second large page size.

For example, the apparatus 130 may be integrated/incorporated with/in any of the processors described herein. In particular, any/all of the circuitry 136 may be integrated/incorporated with/in the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15).

Figure 1C:
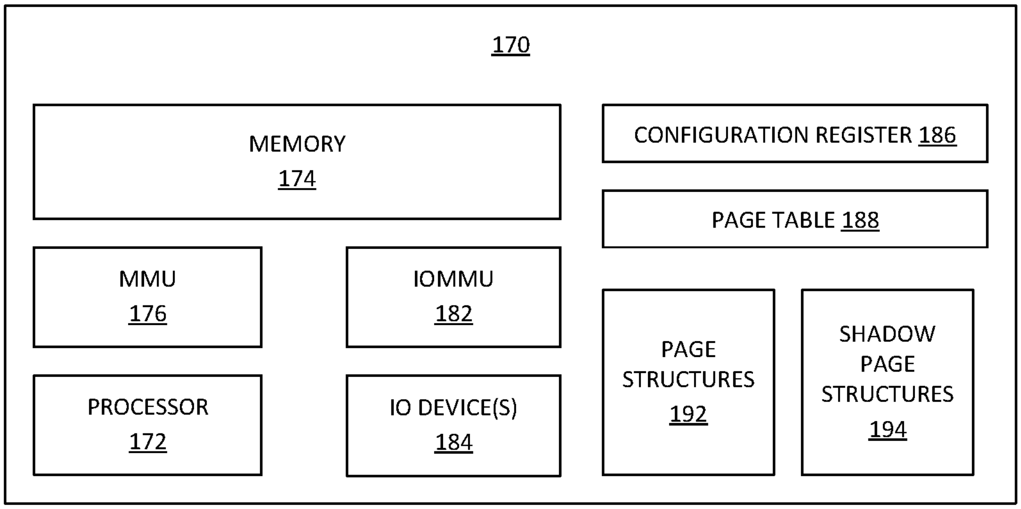
FIG. 1C is a block diagram of an example of a system in one implementation.

With reference to FIG. 1C, an example of a system 170 includes a processor 172, memory 174, a memory management unit (MMU) 176 coupled between the processor 172 and the memory 174, and an IOMMU 182 coupled to the memory 174 to manage access to the memory 174 from one or more IO devices 184 and to selectively track dirty large pages at one or more granularities including at least a first granularity that corresponds to a first size of a large page or at a second granularity that corresponds to a second size of a subset of the large page (e.g., where the large page includes two or more smaller sub-pages). For example, the system 170 may include a page table 188 to store an indication of whether the first size of the large page corresponds to a first large page size or a second large page size, and/or a configuration register 186 to store a global indication of the one or more granularities to be tracked for the dirty large pages. For example, the memory 174 or other memory of the system 170 may store the page table 188 with the indication of whether the first size of the large page corresponds to the first large page size or the second large page size.

In some example, the system 170 may further include non-transitory instructions (e.g., firmware, software, etc.) that when executed by the processor 172 cause the processor 172 to determine if the configuration register 186 stores an indication that the IOMMU 182 is to track dirty large pages at the second granularity and, if so determined, to create a first set of page structures 192 to be utilized by the IOMMU 182 to manage the access to the memory 174 from the one or more IO devices 184, and create a second set of shadow page structures 194 to be utilized by the IOMMU 182 to track dirty subsets of the large pages. For example, the IOMMU 182 may be configured to set a dirty bit in a shadow page table entry of the second set of shadow page structures 194 that corresponds to a modified subset of a modified large page. In some example, the system 170 may further include non-transitory instructions (e.g., firmware, software, etc.) that when executed by the processor 172 cause the processor 172 to migrate only subsets of the large pages indicated as dirty by the second set of shadow page structures 194, in response to a migration request.

For example, the processor 172 may be implemented as any of the processors described herein. In particular, the processor 172 may be implemented as the processor 800, the processor 870, the processor 815, the coprocessor 838, and/or the processor/coprocessor 880 (FIG. 10), the processor 900 (FIG. 11), the core 1090 (FIG. 12B), the execution units 1062 (FIGS. 12B and 13), and the processor 1316 (FIG. 15).

Some embodiments provide technology for fine-grained dirty page tracking of IOMMU second-stage large pages. An IOMMU (e.g., or other remapping hardware that implements IOMMU technology) may support second-stage accessed/dirty (A/D) page tracking for a variety of page sizes (e.g., 4 KB, 2 MB, 1 GB, etc.). When tracking is enabled and a page is modified (e.g., also referred to herein as dirtied), the IOMMU hardware sets the dirty-bit (D) in the respective leaf page table entries (PTEs). During VM live migration, suitable software scans the Second-Stage paging structures to harvest the list of pages modified by the devices. These modified pages are then transmitted/re-transmitted to the remote destination host. The above steps continue several times during the course of a VM Live Migration.

In some implementations, a large page (e.g., a 2 MB page, a 1 GB page, etc.) may be composed of contiguous smaller sub-pages (e.g., 4 KB pages). For example, a 1 GB large page may consist of 262144×4 KB pages and a 2 MB large page may consist of 512×4 KB pages. Even when a single 4 KB page of a large page is modified, for conventional large page granularity the IOMMU hardware sets the dirty-bit in the large page leaf PTE. When software harvests a list of dirty pages, the entire large page is considered dirty, and the page is transmitted to the destination host during live migration. In some example, IOMMU hardware is configured is to enable the remapping hardware to track a subset or a range of 4 KB pages that are dirtied, when a large page is modified by a device (e.g., allowing finer-grained control of dirty page tracking for a large page).

Figures 2A, 2B:
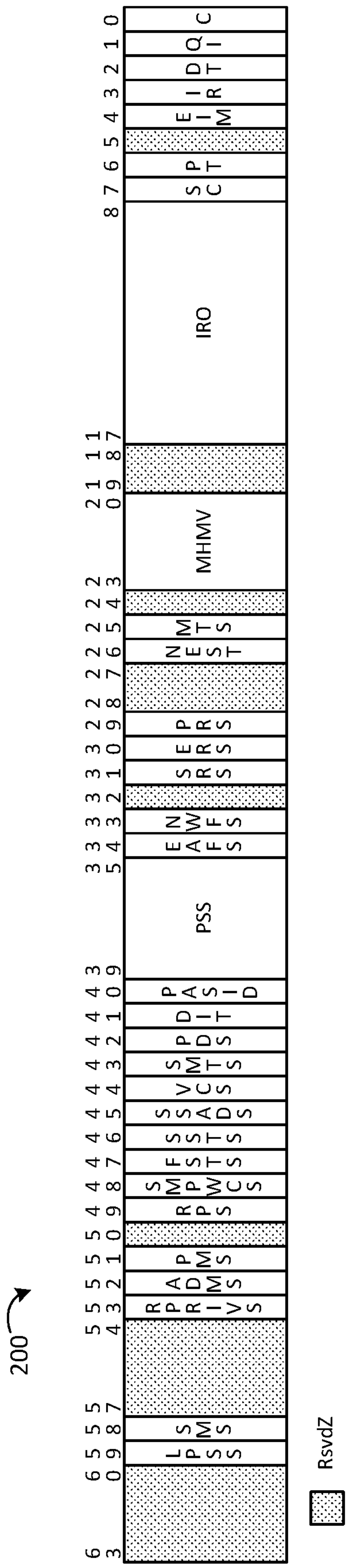
FIG. 2A is an illustrative diagram of an example of a configuration register that supports finer-grained dirty page tracking for a large page in one implementation.
FIG. 2B is an illustrative diagram of an example of a register field that supports finer-grained dirty page tracking for a large page in one implementation.

FIG. 2A shows an example of a configuration register 200 that supports finer-grained control of dirty page tracking for a large page. For example, remapping hardware (e.g., an IOMMU) may expose the support for finer-grained control of dirty page tracking for a large page in a field in the register 200. The field in the register 200 may nominally be referred to as a large page shadow support (LPSS) field. In some implementations, the register 200 may correspond to an Extended-Capability Register (ECAP_REG) and the LPSS field may correspond to a bit at position 59 in the register 200. Various fields of the register 200 may be reserved or reserved and zero (RsvdZ). The RsvdZ bits/fields may be reserved and software should use zero (0) for writes to the RsvdZ bits/fields. FIG. 2B shows an example of a table that describes attributes of the LPSS field at bit 59, including read-only (RO) access (e.g., the LPSS bit can only be read by software, writes have no effect; the value of the LPSS bit is determined by the hardware only) and a default value of one (1). A LPSS bit value of zero (0) indicates that the hardware does not support shadowing of a second-stage page directory pointer entry (SS-PDPE) and a second-stage page directory entry (SS-PDE). A LPSS bit value of one (1) indicates that the hardware supports shadowing of a SS-PDPE and a second-stage page directory entry SS-PDE.

Hardware implementations that otherwise report second-stage large page support (SSLPS) or second-stage accessed/dirty support (SSADS) as clear may also report the LPSS bit as clear.

FIG. 3 shows an example of a paging structure 300 for second-stage paging entries. The paging entries of the paging structure 300 may be similar to entries described in an Intel® VT-d specification, with an additional field to indicate whether shadow pages are created by the OS (e.g., or other software). For example, as shown in FIG. 3, the paging structure 300 utilizes bit position 62 as a shadow bit (SB) field in a second-stage paging entry of the paging structure 300 to indicate if software/OS is creating shadow pages or not. The software/OS may set/clear the SB bit to indicate if the SS-PDPE/SS-PDE is shadowed or not. In some examples, the SB bit (bit 62) is set to a value of one (1) by the software to indicate to the remapping hardware that a shadow page exists for dirty subsets of a large page to be tracked. If the SB bit is clear (e.g., bit 62 has a value of zero (0)), there is no shadowing done by the software and the remapping hardware tracks dirty large pages at the large page granularity.

Figure 4A:
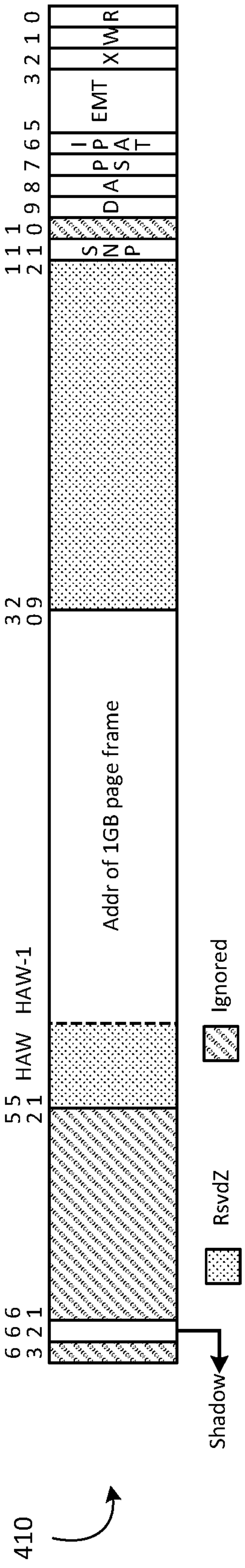
FIGS. 4A to 4C show illustrative examples of entries in paging structures that support finer-grained dirty page tracking for a large page in accordance with some implementations.
Figure 4B:
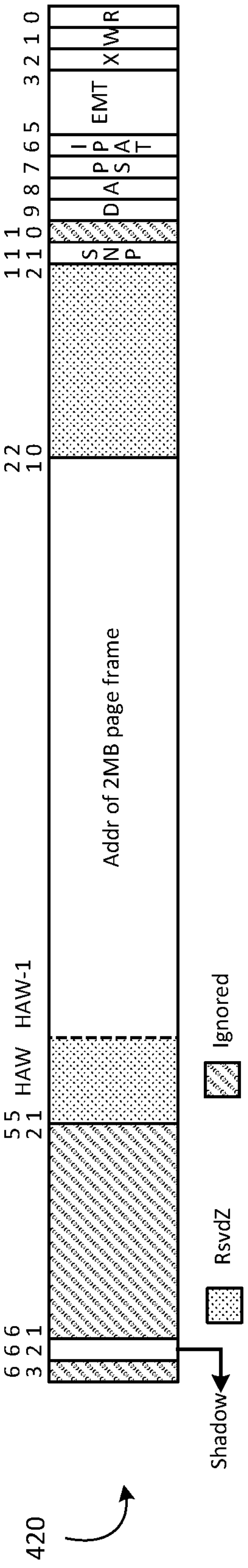
Figure 4C:
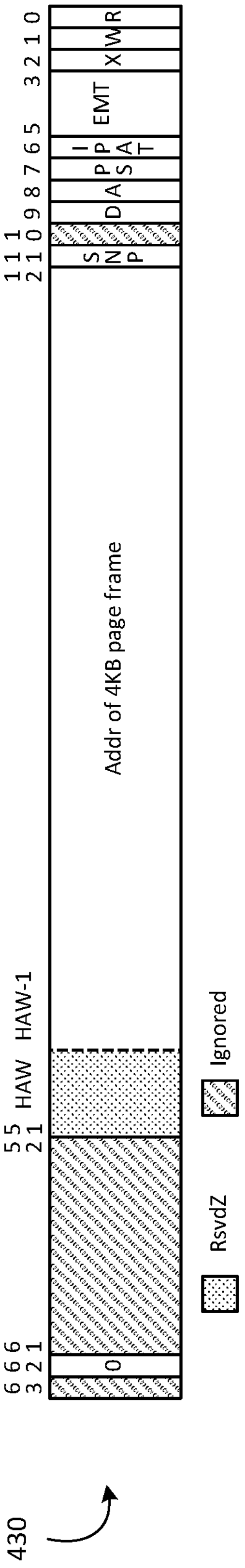

FIGS. 4A to 4C shows respective examples of a second-stage page directory pointer entry (SS-PDPE) 410 (FIG. 4A), a second-stage page directory entry (SS-PDE) 420 (FIG. 4B), and a second-stage page table entry (SS-PTE) 430 (FIG. 4C). For the SS-PTE 430 mapping to a 4 KB page, the SB (e.g., bit 62) is always cleared to zero (0) by the software/OS.

FIGS. 5A to 5D show an example of an OS page allocation mechanism and shadowing technology to enable dirty subset tracking for 2 MB large pages. The software may check if the remapping hardware includes large page shadow support by examining the LPSS bit in the ECAP_REG register (e.g., ECAP_REG[LPSS]). On successful detection of large page shadow support, the software may enable shadowing by writing a one (1) to the SB bit (e.g., bit 62) of the SS-PDE in the second-stage paging structures.

When the software sets up the mappings in the IOMMU, the software may also create hierarchical page-tables. To support shadowing, as shown in FIG. 5A, when the software creates a second-stage page directory (SS-PD) table 510, the software also creates another page of the same size (e.g., 4 KB) referred to herein as a second-stage shadow page directory (SS-SPD) table 520. The SS-PD and SS-SPD pages may be adjacent and physically contiguous. For example, the OS page allocation mechanism may be configured to allocate the SS-PD 510 and the SS-SPD 520 as two contiguous pages. The contiguous arrangement of the SS-PD 510 and the SS-SPD 520 may simplify the address calculation for the shadowed page because adding a fixed offset of the page size (e.g., 4 KB) to the original page results in the address of the shadowed page, thereby avoiding additional indirections.

Both the SS-PD 510 and the SS-SPD 520 may have a table structure. An entry in the SS-PD table 510 may have the format of the SS-PDE 420 as shown in FIG. 4B. An entry in the SS-SPD table 520 may be referred to herein as a second-stage shadow page directory entry (SS-SPDE). In this example, the shadowed SS-SPDE is at a fixed offset from its corresponding SS-PDE. For example, an SS-SPDE 522 is at an offset of 4 KB from a corresponding SS-PDE 512.

As shown in FIG. 4B, an SS-PDE includes a page size (PS) field. In this example, the software sets the PS field to one (1) to map to a 2 MB large page size. As shown in FIG. 5B, for a 2 MB large page size an SS-SPDE 530 has a format of a 64-bit bit-field vector. FIG. 5C shows an example description of the SS-SPDE 530 where bits 63:0 is a dirty 4 KB field (D4K). As noted in FIG. 5C, the SS-SPDE 530 is a 64-bit field. Each bit field indicates a range of dirty 4K pages, where the bit is cleared to a value of zero (0) if the indicated range of 4 KB pages are not dirty and the bit is set to a value of one (1) if the indicated range of 4 KB pages are dirty. For example, suitably configured remapping hardware as described herein may set appropriate bits in the D4K field, and suitably configured software may clear appropriate bits in the D4K field.

FIG. 5D shows an example of how the SS-SPDE 530 corresponds to a range of 4K sub-pages of the 2 MB large page. A 2 MB large page consists of 512×4 KB pages. Accordingly, each bit in the SS-SPDE maps to a range of eight pages where each page is 4 KB in size. As shown in FIG. 5C, each bit in the SS-SPDE 530 corresponds to a particular range of 4 KB pages, in the 2 MB large page. If any page within the range of eight pages is modified, the remapping hardware will set the corresponding bit the in the SS-SPDE to indicate that the entire range should be considered dirtied.

For an example VM with an allocation of 512 GB memory, all the VM pages may be mapped as 2 MB large pages in the IOMMU and pinned. Each SS-PDE can map to a 2 MB Page, and each SS-PD can hold 512 SS-PDE entries. The software may create 512 SS-PD pages in the platform for the VM and 512 corresponding SS-SPD pages. An additional 2 MB of memory is needed for the SS-SPD pages. In an operation example, if only bit-3 of an SS-SPDE is set, the SS-SPDE indicates that only 4 KB pages in the range of 24-31 of the 2 MB large page are considered dirty. Software can then transmit/re-transmit only the indicated range of 4 KB dirty pages, instead of transmitting the entire 2 MB dirty page. Software may also have the responsibility to clear the corresponding bits in the SS-SPDE after the software has harvested the dirty sets of pages.

Figure 6:
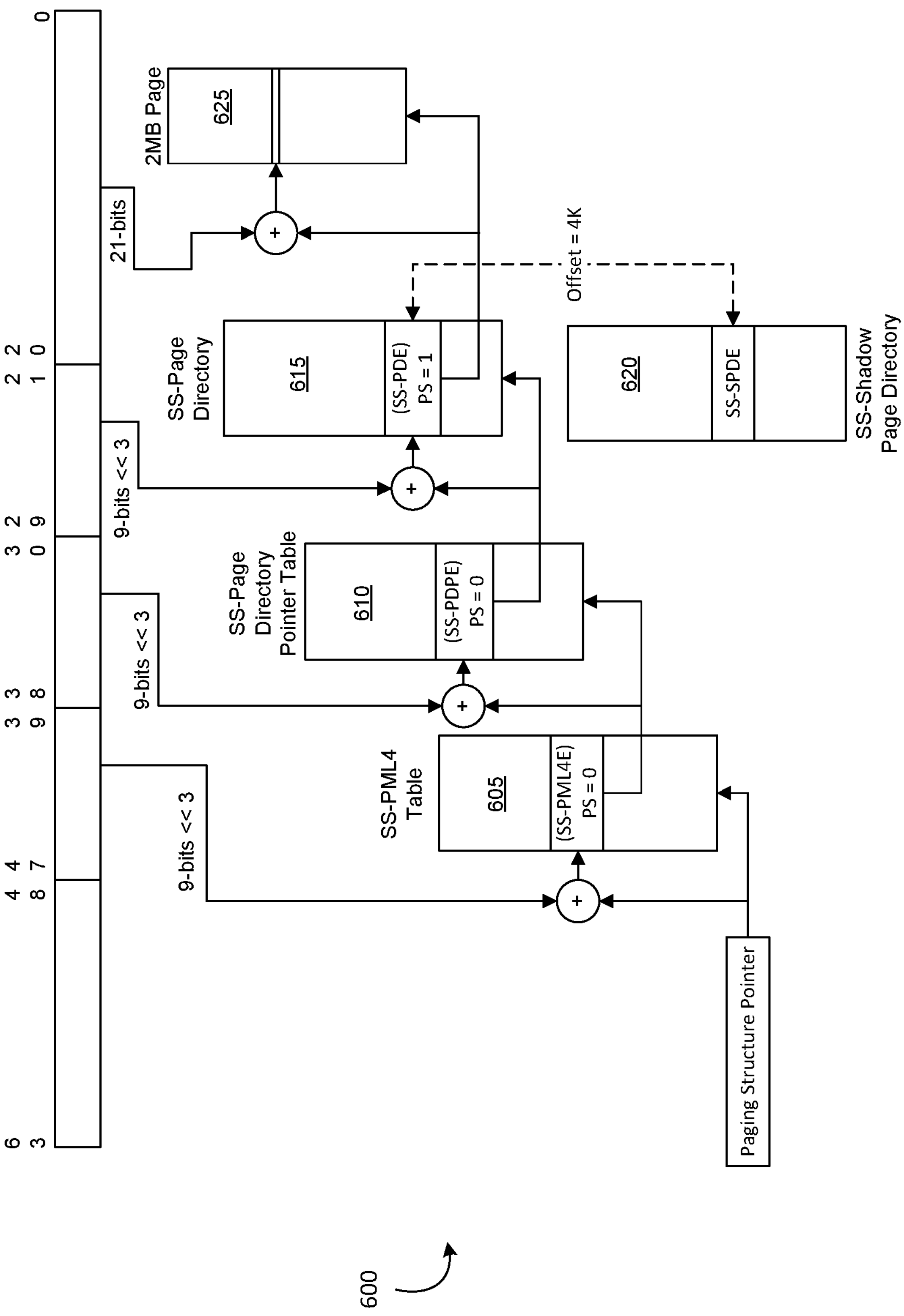
FIG. 6 is an illustrative diagram of another example of a paging structure that supports finer-grained dirty page tracking for a large page in one implementation.

FIG. 6 shows an example of paging structure 600 for remapping hardware to set the dirty bit in an SS-SPDE. The paging structure 600 includes a second-stage page map level four (SS-PML4) table 605, a SS-page directory pointer (SS-PDP) table 610, a SS-PD 615, and a SS-SPD 620. The remapping hardware may enable finer-grained dirty page tracking for 2 MB large pages. As noted above, an SS-SPDE is 64-bits wide and consists of 64 bit-fields. In this example, if bit-field 'N' is set in an SS-SPDE, 4 KB pages in the range of [(N<<3) to (N<<3+7)] in the 2 MB large page are indicated as dirty.

As shown in FIG. 6, the remapping hardware may utilize the paging structure 600 for translating a 48-bit address to a 2 MB large page 625. The remapping hardware sets the dirty bit in the SS-PDE if the 2 MB large page 625 is modified (dirtied). If ECAP_REG[LPSS] indicates that large page shadowing is supported, and if software has enabled shadowing of the SS-PDE (e.g., by setting SB in the SS-PDE), the remapping hardware performs fine-grained tracking of dirty 4 KB pages inside a dirty large page. The remapping hardware computes the address of the corresponding SS-SPDE by adding an offset of 4 KB to the address of SS-PDE. The remapping hardware sets the appropriate bit-vector fields by computing the offset of the 4 KB page that was modified. To set the appropriate bit-vector field, the remapping hardware uses the bits 20:12 of the input address to determine the page-number of the 4 KB page. The remapping hardware then uses the page-number value to compute the bit-vector field to be set in the SS-SPDE entry. If the bit was already set, the bit is not modified by the remapping hardware until software clears the bit.

The range of values reported in 9-bits (e.g., bits 20:12 of the input address) is between 0 and 511. In an operational example, the remapping hardware takes the bits 20:12 of the input address and computes a page-number value of twenty (20). The remapping hardware then computes the bit-vector field to be set in the SS-SPDE by right-shifting the page-number value three (3) bit positions. The computed bit-vector field to be set by the remapping hardware in SS-SPDE is twenty right shifted three positions (e.g., 20>>3) that results in bit-vector field number two (2). The remapping hardware then sets SS-SPDE[bit 2] to one (1) to indicate that the range of 4 KB pages from 16-23 are to be considered dirty.

FIGS. 7A to 7D show an example of an OS page allocation mechanism and shadowing technology to enable dirty subset tracking for 1 GB large pages. In some examples, an indirect shadow page structure may be utilized to increase the finer-grained granularity to track dirty subsets for a 1 GB large page. Software checks if the remapping hardware supports large page shadowing by examining the bit in the ECAP_REG register (ECAP_REG[LPSS]). On successful detection of large page shadow support, the software can enable shadowing by writing to the SB (e.g., bit-62) of the second-stage paging structures, such as entries in a SS-PDP table.

When the software sets up the mappings in the IOMMU, the software may also create hierarchical page-tables. To support shadowing, as shown in FIG. 7A, when the software creates a page for a SS-PDP table 710, the software also creates another page of the same size (e.g., 4 KB) referred to herein as a second-stage shadow page directory pointer (SS-SPDP) table 720. The SS-PDP and SS-SPDP pages may be adjacent and physically contiguous. For example, the OS page allocation mechanism may be configured to allocate the SS-PDP 710 and the SS-SPDP 720 as two contiguous pages. The contiguous arrangement of the SS-PDP 710 and the SS-SPDP 720 may simplify the address calculation for the shadowed page because adding a fixed offset of the page size (e.g., 4 KB) to the original page results in the address of the shadowed page, thereby avoiding an extra indirection for the SS-SPDP 720.

Both the SS-PDP 710 and the SS-SPDP 720 may have a table structure. An entry in the SS-PDP table 710 may have the format of the SS-PDPE 410 as shown in FIG. 4A. An entry in the SS-SPDP table 720 may be referred to herein as a second-stage shadow page directory entry (SS-SPDPE). In this example, the shadowed SS-SPDPE is at a fixed offset from its corresponding SS-PDPE. For example, an SS-SPDPE 722 is at an offset of 4 KB from a corresponding SS-PDPE 712.

As shown in FIG. 4A, an SS-PDPE includes a page size (PS) field. In this example, the software sets the PS field to one (1) to map to a 1 GB large page size. As shown in FIG. 7B, for a 1 GB large page size an SS-SPDPE 730 is 64 bits wide and the software programs each entry to point to a 4 KB dirty bit-field page allocated by the software. The 4 KB dirty bit-field page does not have to be contiguous with the SS-PDP or the SS-SPDP. FIG. 7C shows an example description of the SS-SPDPE 730 where bits 63:12 are an address field and bits 11:0 are RsvdZ. As noted in FIG. 7C, the address field points to a 4 KB aligned host physical address of a page used as bit-fields (e.g., the 4 KB dirty bit-field page.

FIG. 7D shows an example of a 4 KB dirty bit-field page 740. The dirty bit-field page 740 provides more bit fields to correspond to more ranges of 4K sub-pages of the 1 GB large page (e.g., 4096 bit fields for the 1 GB large page as compared to 64 bit fields for the 2 MB large page). The 4 KB dirty bit-field page 740 is formatted as a bit-vector field with bit fields 0 . . . 4095. Each set bit in the 4 KB dirty bit-field page 740 corresponds to a range of 4 KB pages dirtied in the dirty 1 GB large page. A 1 GB large page consists of 262144×4 KB pages. Accordingly, each bit in the 4 KB dirty bit-field page 740 maps to a range of sixty four (64) dirtied sub-pages where each sub-page is 4 KB in size. Without the indirection, the level of granularity would not be as fine (e.g., a range 4096 dirtied sub-pages per 64-bit vector without the indirection). If any page within the range of sixty four pages is modified, the remapping hardware will set the corresponding bit the in the 4 KB dirty bit-field page 740 to indicate that the entire range should be considered dirtied.

For an example VM with an allocation of 512 GB memory, all the VM pages may be mapped as 1 GB large pages in the IOMMU and pinned. Each SS-PDPE can map to a 1 GB Page, and each SS-PDP can hold 512 SS-PDPE entries. The software may create one (1) SS-PDP page in the platform for the VM, one (1) SS-SPDP page, and 512 corresponding 4 KB dirty bit-field pages. A little over an additional 2 MB of memory is needed for the SS-SPDP and dirty bit-field pages. In an operation example, if only bit-3 of a 4 KB dirty bit-field page is set, only 4 KB pages in the range of 192-255 of the 1 GB large page are considered dirty. Software can then transmit/re-transmit only the indicated range of 4 KB dirty pages, instead of transmitting the entire 1 GB dirty page. Software may also have the responsibility to clear the corresponding bits in the 4 KB dirty bit-field page after the software has harvested the dirty sets of pages.

Figure 8:
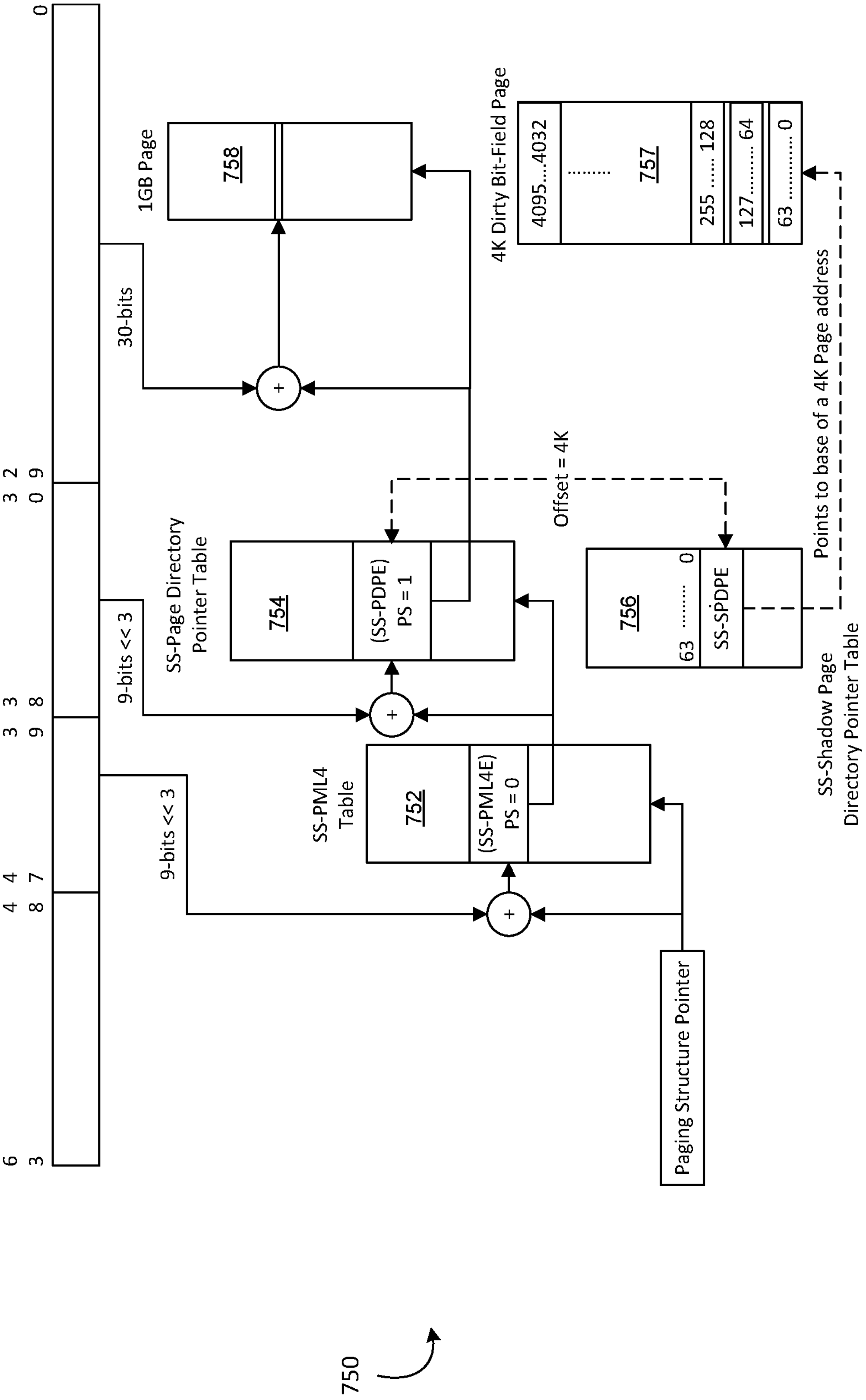
FIG. 8 is an illustrative diagram of another example of a paging structure that supports finer-grained dirty page tracking for a large page in one implementation.

FIG. 8 shows an example of paging structure 750 for remapping hardware to set the dirty bit in a 4 KB dirty bit-field page. The paging structure 750 includes a SS-PML4 table 752, a SS-PDP table 754, a SS-SPDP table 756, and a 4 KB dirty bit-field page 757. The remapping hardware may enable finer-grained dirty page tracking for 1 GB large pages. As noted above, an SS-SPDPE entry is 64-bits and points to the base of the 4 KB dirty bit-field page 757. Each 4 KB dirty bit-field page consists of 4096 bit-vector fields. If bit-field 'N' is set in the 4 KB dirty bit-field page 757, 4 KB pages in the range of [(N<<6) to (N<<6+63)] in the 1 GB large page are indicated as dirty.

As shown in FIG. 8, the remapping hardware may utilize the paging structure 750 for translating a 48-bit address to a 1 GB large page 758. The remapping hardware sets the dirty bit in the SS-PDPE if the 1 GB large page is modified (dirtied). If ECAP_REG[LPSS] is supported, and if software has enabled shadowing of SS-PDPE (e.g., by setting SB in the SS-PDPE), the remapping hardware performs fine-grained tracking of dirty subset pages for a dirty large page mapping. The remapping hardware computes the address of the corresponding SS-SPDPE by adding an offset of 4 KB to the address of SS-PDPE. The remapping hardware then reads the SS-SPDPE entry populated by the software. The address stored in the SS-SPDPE is used as an indirection entry by the remapping hardware to locate the 4 KB bit-vector page 757. The page 757 includes dirty bit fields 0 through 4095, where each dirty bit field represents a range of 4 KB dirty pages.

The remapping hardware sets the appropriate bit-vector field in the 4 KB page 757 by computing the offset of the 4 KB page that was modified. To compute the offset of the 4 KB page that was modified, the remapping hardware uses the bits 29:12 of the input address to determine the page-number of the 4 KB page. The remapping hardware then uses the page-number value to compute the bit-vector field to be set in the 4 KB dirty bit-field page 757. If the bit was already set, the bit is not modified by the remapping hardware until software clears the bit.

The range of values reported in 18-bits (e.g., bits 29:12 of the input address) is between 0 and 262143. In an operational example, the remapping hardware takes the bits 29:12 of the input address and computes a page-number value of one hundred fifty (150). The remapping hardware then computes the bit-vector field to be set in the 4 KB dirty bit-field page by right-shifting the page-number value by six (6) bit positions. In this example, the bit-vector field to be set by the remapping hardware in the 4 KB dirty bit-field page is one hundred fifty right shifted by six bit positions (e.g., 150>>6), that results in bit-vector field number two (2). The remapping hardware then sets bit-2 of the 4 KB dirty bit-field page to a value of one (1) to indicate the range of 4 KB pages from 128-191 are to be considered dirty.

Figure 9A:
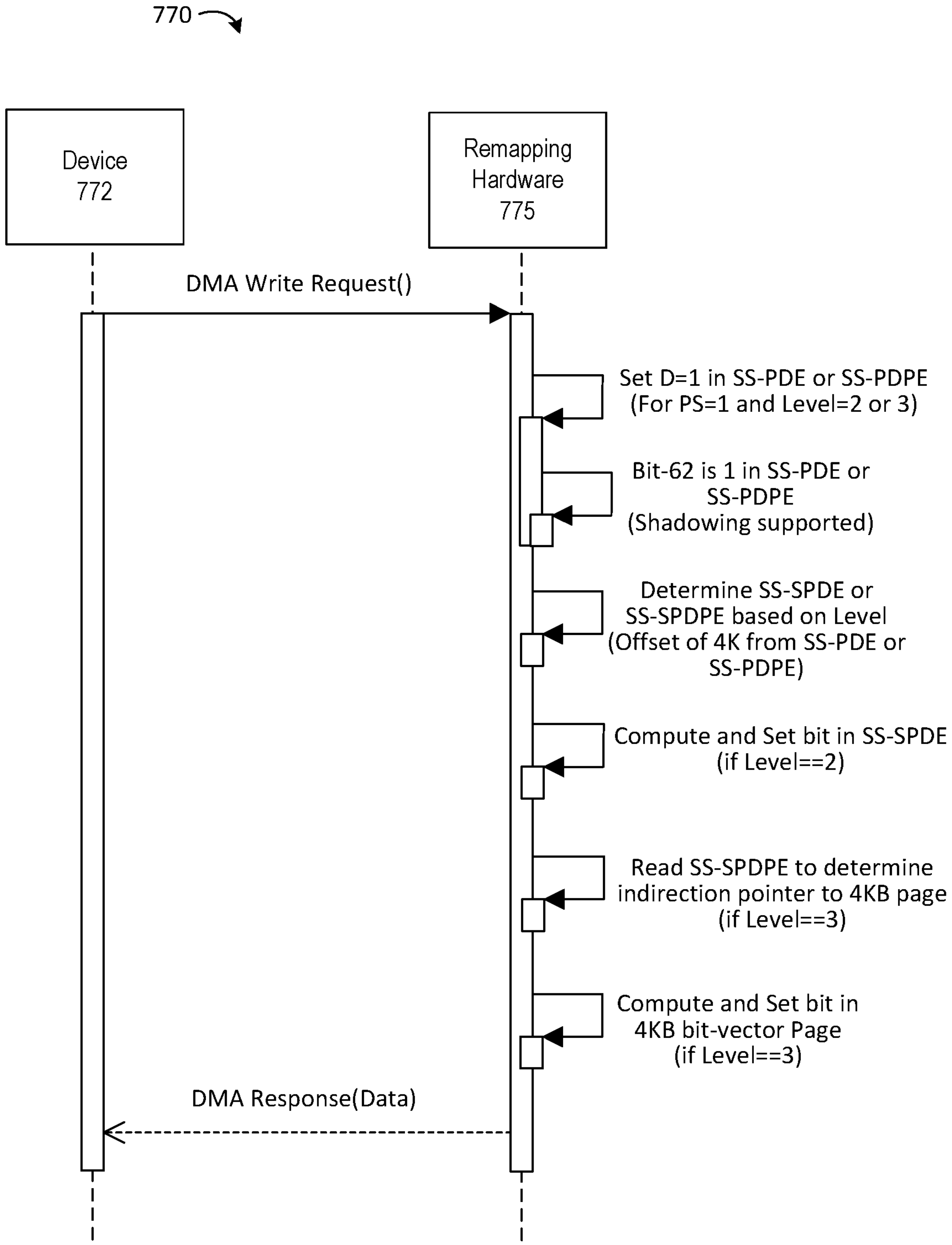
FIGS. 9A to 9B are illustrative flow diagrams of respective flows that support finer-grained dirty page tracking for a large page in accordance with some implementations.

FIG. 9A shows an example of a flow 770 where remapping hardware is enabled for fine-grained dirty bit tracking for dirty large pages. A device 772 sends a direct memory access (DMA) write request. In response to the DMA write request, remapping hardware sets a dirty bit (D=1) in SS-PDE or SS-PDPE (for PS=1 and Level=2 or 3). Next, the remapping hardware 775 then determines if shadowing is supported based on bit-62 being set in SS-PDE or SS-PDPE and, if so, determine whether the shadow page structure is SS-SPDE or SS-SPDPE based on the level (e.g., 2 MB or 1 GB). The remapping hardware 775 then computes and sets the appropriate bit in the SS-SPDE (if level==2), or reads the SS-SPDPE to determine the indirection pointer to the 4 KB bit-vector page and computes and set the appropriate bit in the 4 KB bit-vector page (if level==3). The remapping hardware 775 then provides a DMA response to the device 772.

Figure 9B:
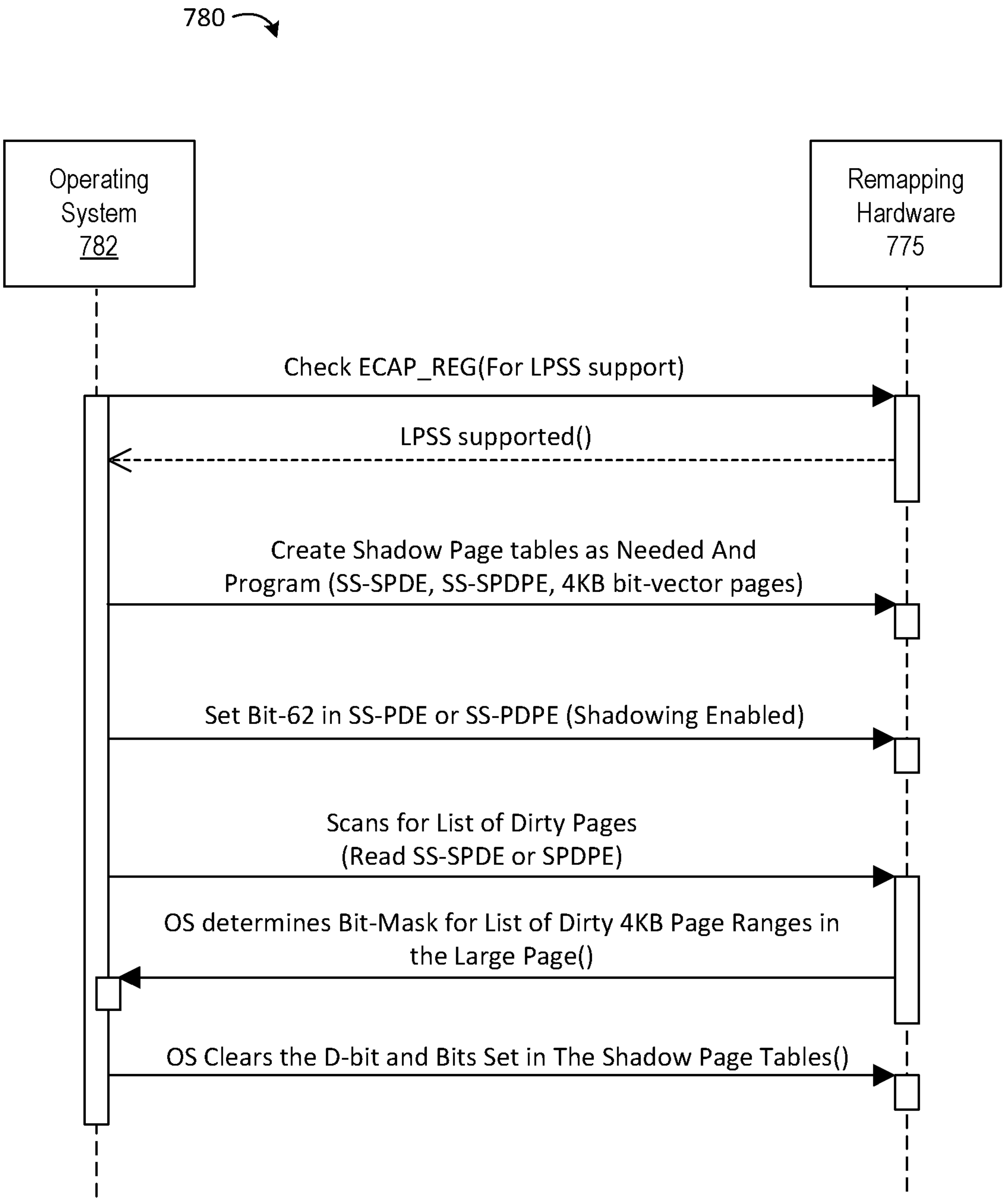

FIG. 9B shows an example of a flow 780 where software/OS 782 interacts with the remapping hardware 775 track dirty subset pages (for large pages) and clears dirty bits. The OS 782 checks the ECAP_REG for LPSS support and the remapping hardware reports that LPSS is supported. The OS 782 then creates page tables and shadow page tables as needed and programs the bits in the tables (e.g., setting bit-62 in SS-PDE or SS-PDPE to enable shadowing for dirty subset page tracking). At some time thereafter (e.g., in response to a migration request), the OS 782 scans the shadow page tables for a list of dirty subset pages. The remapping hardware 775 returns a bit-mask for the list of dirty 4 KB page ranges in the large page. After the operation on the large page is completed (e.g., following successful migration), the OS 782 clears the D-bit and the dirty bits set in the shadow page tables.

Advantageously, some examples may provide faster VM Live migrations, may reduce an amount of time during when the VM is quiesced to enable switch-over from source to destination host, may reduce a performance penalty (e.g., latency, throughput, etc.) encountered by guest applications during and after VM migration, may reduce an amount of data transmitted over the network between the source and destination host (e.g., allowing faster and efficient use of the migration network bandwidth), and/or may enables software to transmit/re-transmit only a subset of dirty 4 KB pages for a dirtied large page (e.g., improving the efficiency and/or performance of the OS network stack).

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 10:
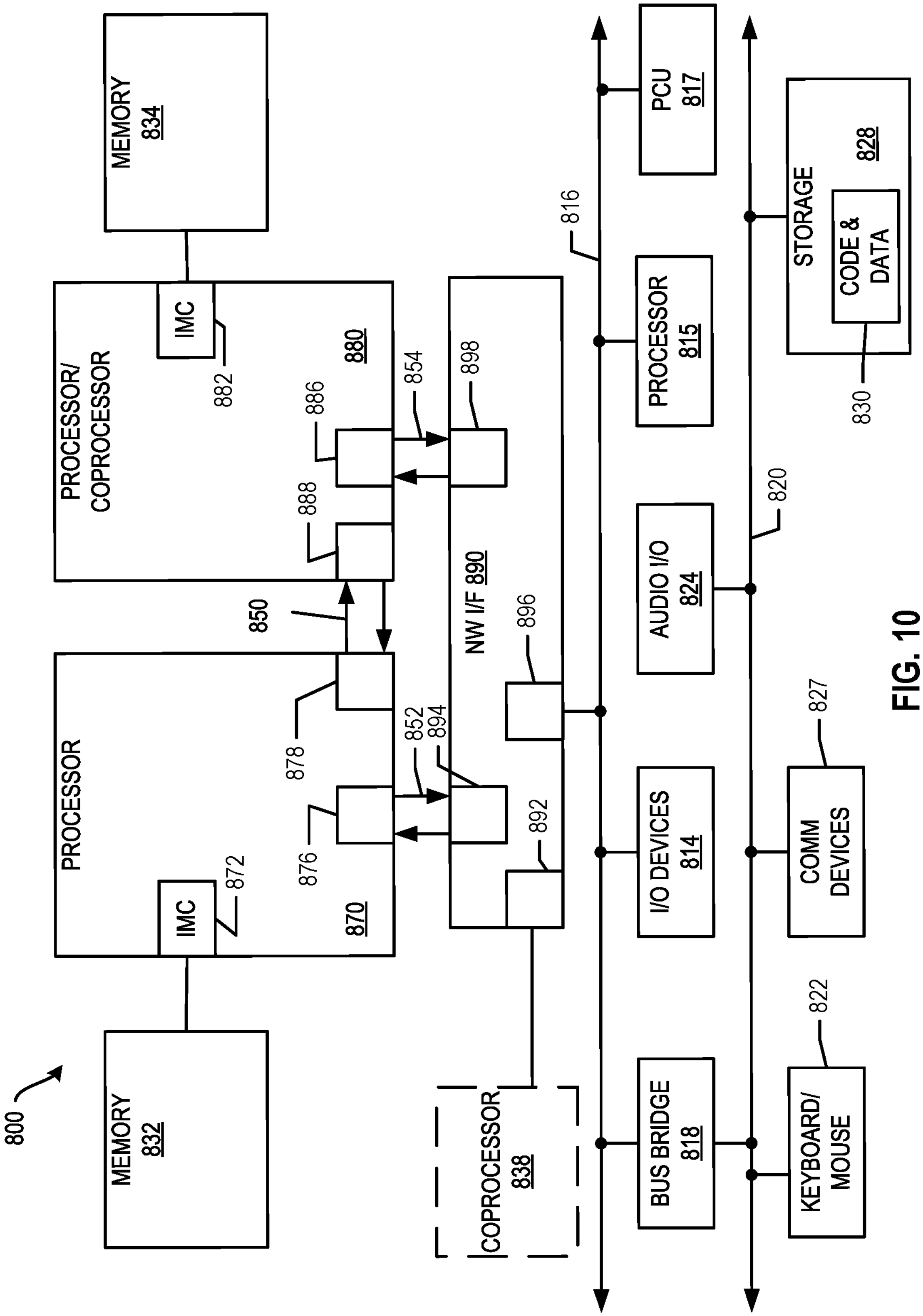
FIG. 10 illustrates an example computing system.

FIG. 10 illustrates an example computing system. Multiprocessor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a system on a chip (SoC).

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 11:
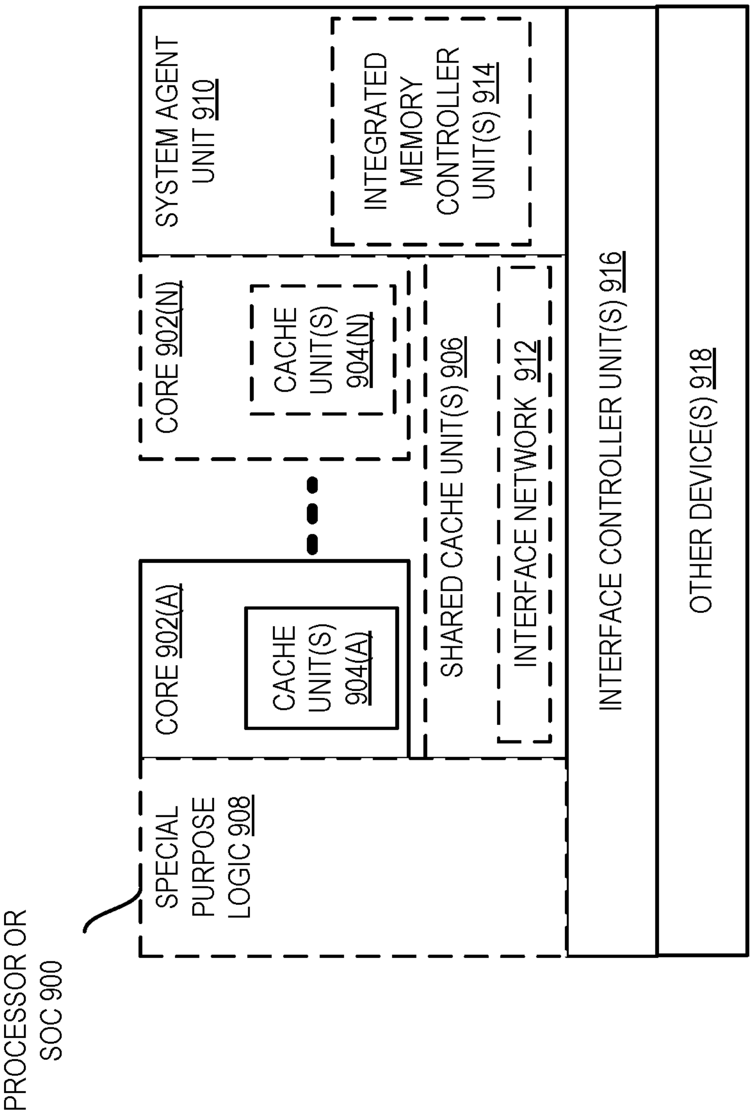
FIG. 11 illustrates a block diagram of an example processor and/or System on a Chip (SoC) that may have one or more cores and an integrated memory controller.

FIG. 11 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 10.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908 (e.g., integrated graphics logic), the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Example Core Architectures—In-Order and Out-of-Order Core Block Diagram.

Figure 12A:
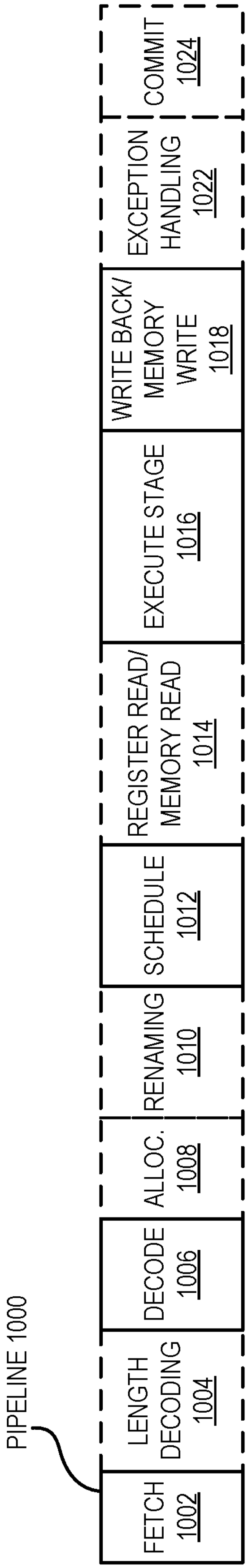
FIG. 12A is a block diagram illustrating both an example in-order pipeline and an example register renaming, out-of-order issue/execution pipeline according to examples.
Figure 12B:
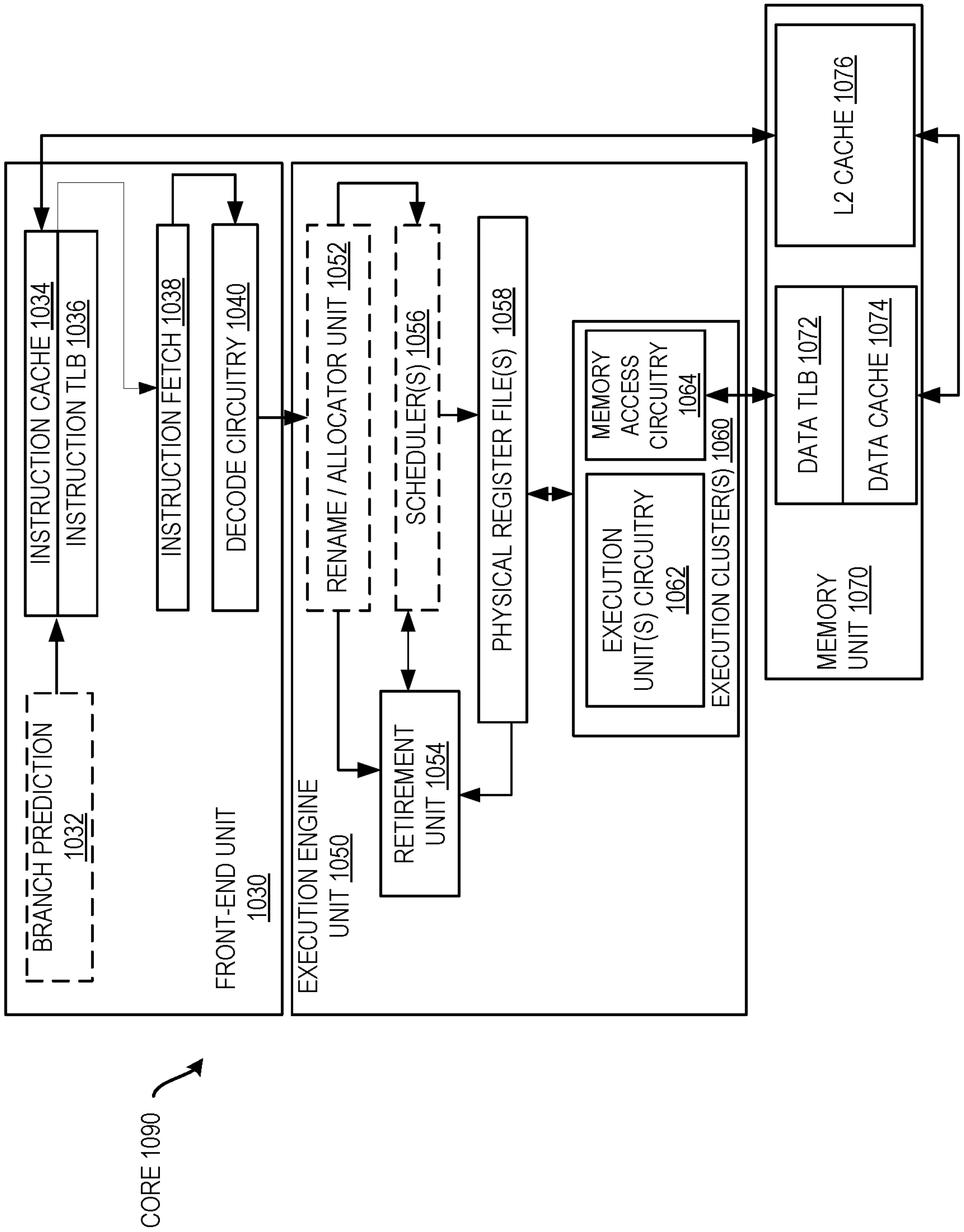
FIG. 12B is a block diagram illustrating both an example in-order architecture core and an example register renaming, out-of-order issue/execution architecture core to be included in a processor according to examples.

FIG. 12A is a block diagram illustrating both an example in-order pipeline and an example register renaming, out-of-order issue/execution pipeline according to examples. FIG. 12B is a block diagram illustrating both an example in-order architecture core and an example register renaming, out-of-order issue/execution architecture core to be included in a processor according to examples. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1000 includes a fetch stage 1002, an optional length decoding stage 1004, a decode stage 1006, an optional allocation (Alloc) stage 1008, an optional renaming stage 1010, a schedule (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, and during the decode stage 1006, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1006 and the register read/memory read stage 1014 may be combined into one pipeline stage. In one example, during the execute stage 1016, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 12B may implement the pipeline 1000 as follows: 1) the instruction fetch circuitry 1038 performs the fetch and length decoding stages 1002 and 1004; 2) the decode circuitry 1040 performs the decode stage 1006; 3) the rename/allocator unit circuitry 1052 performs the allocation stage 1008 and renaming stage 1010; 4) the scheduler(s) circuitry 1056 performs the schedule stage 1012; 5) the physical register file(s) circuitry 1058 and the memory unit circuitry 1070 perform the register read/memory read stage 1014; the execution cluster(s) 1060 perform the execute stage 1016; 6) the memory unit circuitry 1070 and the physical register file(s) circuitry 1058 perform the write back/memory write stage 1018; 7) various circuitry may be involved in the exception handling stage 1022; and 8) the retirement unit circuitry 1054 and the physical register file(s) circuitry 1058 perform the commit stage 1024.

FIG. 12B shows a processor core 1090 including front-end unit circuitry 1030 coupled to execution engine unit circuitry 1050, and both are coupled to memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit circuitry 1030 may include branch prediction circuitry 1032 coupled to instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, microcode entry points, microinstructions, other instructions, or other control signals, which are decoded from, or which otherwise reflect, or are derived from, the original instructions. The decode circuitry 1040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front-end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, address generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to data cache circuitry 1074 coupled to level 2 (L2) cache circuitry 1076. In one example, the memory access circuitry 1064 may include load unit circuitry, store address unit circuitry, and store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, level 3 (L3) cache circuitry (not shown), and/or main memory. The L2 cache circuitry 1076 is coupled to one or more other levels of cache and eventually to a main memory.

The core 1090 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1090 includes logic to support a packed data instruction set architecture extension (e.g., AVX1, AVX2), thereby allowing the operations used by many multimedia applications to be performed using packed data.

Example Execution Unit(s) Circuitry.

Figure 13:
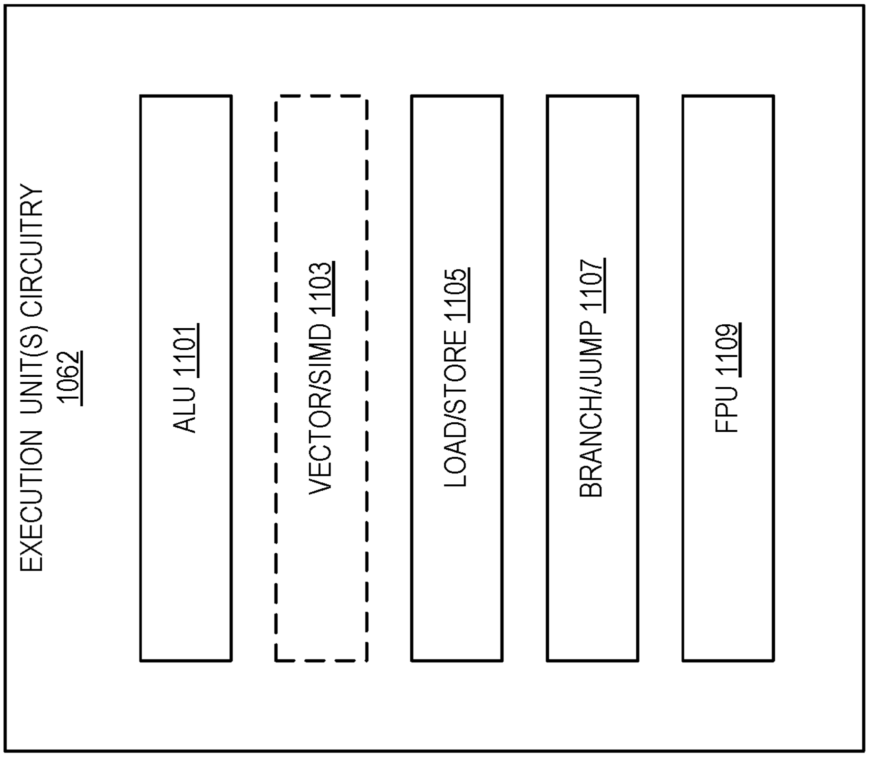
FIG. 13 illustrates examples of execution unit(s) circuitry.

FIG. 13 illustrates examples of execution unit(s) circuitry, such as execution unit(s) circuitry 1062 of FIG. 12B. As illustrated, execution unit(s) circuitry 1062 may include one or more ALU circuits 1101, optional vector/single instruction multiple data (SIMD) circuits 1103, load/store circuits 1105, branch/jump circuits 1107, and/or Floating-point unit (FPU) circuits 1109. ALU circuits 1101 perform integer arithmetic and/or Boolean operations. Vector/SIMD circuits 1103 perform vector/SIMD operations on packed data (such as SIMD/vector registers). Load/store circuits 1105 execute load and store instructions to load data from memory into registers or store from registers to memory. Load/store circuits 1105 may also generate addresses. Branch/jump circuits 1107 cause a branch or jump to a memory address depending on the instruction. FPU circuits 1109 perform floating-point arithmetic. The width of the execution unit(s) circuitry 1062 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 14:
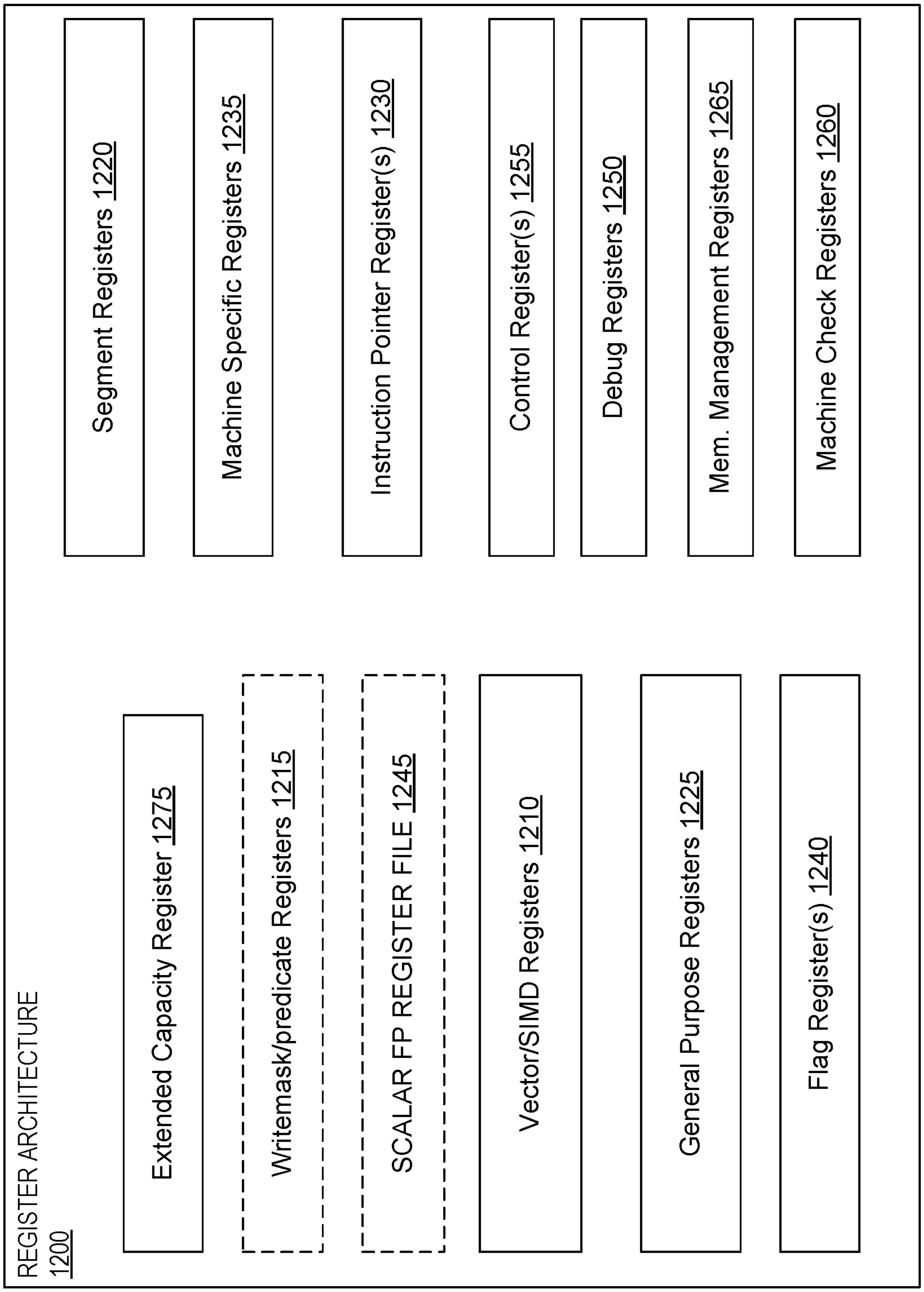
FIG. 14 is a block diagram of a register architecture according to some examples.

FIG. 14 is a block diagram of a register architecture 1200 according to some examples. As illustrated, the register architecture 1200 includes vector/SIMD registers 1210 that vary from 128-bit to 1,024 bits width. In some examples, the vector/SIMD registers 1210 are physically 512-bits and, depending upon the mapping, only some of the lower bits are used. For example, in some examples, the vector/SIMD registers 1210 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1200 includes writemask/predicate registers 1215. For example, in some examples, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1215 corresponds to a data element position of the destination. In other examples, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1200 includes scalar floating-point (FP) register file 1245 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some examples, the one or more flag registers 1240 are called program status and control registers.

Segment registers 1220 contain segment points for use in accessing memory. In some examples, these registers are referenced by the names CS, DS, SS, ES, FS, and GS.

Machine specific registers (MSRs) 1235 control and report on processor performance. Most MSRs 1235 handle system-related functions and are not accessible to an application program. Machine check registers 1260 consist of control, status, and error reporting MSRs that are used to detect and report on hardware errors.

One or more instruction pointer register(s) 1230 store an instruction pointer value. Control register(s) 1255 (e.g., CR0-CR4) determine the operating mode of a processor (e.g., processor 870, 880, 838, 815, and/or 900) and the characteristics of a currently executing task. Debug registers 1250 control and allow for the monitoring of a processor or core's debugging operations.

Memory (mem) management registers 1265 specify the locations of data structures used in protected mode memory management. These registers may include a global descriptor table register (GDTR), interrupt descriptor table register (IDTR), task register, and a local descriptor table register (LDTR) register.

An extended capability register 1275 reports remapping hardware extended capabilities. A bit or field in the extended capability register 1275 may indicate if large page shadowing is supported.

Alternative examples may use wider or narrower registers. Additionally, alternative examples may use more, less, or different register files and registers. The register architecture 1200 may, for example, be used in register file/memory, or physical register file(s) circuitry 10 58.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 15 shows a program in a high-level language 1302 may be compiled using a first ISA compiler 1304 to generate first ISA binary code 1306 that may be natively executed by a processor with at least one first ISA core 1316. The processor with at least one first ISA core 1316 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 1304 represents a compiler that is operable to generate first ISA binary code 1306 (e.g., object code) that can, with or without additional linkage processing, be executed on the processor with at least one first ISA core 1316. Similarly, FIG. 15 shows the program in the high-level language 1302 may be compiled using an alternative ISA compiler 1308 to generate alternative ISA binary code 1310 that may be natively executed by a processor without a first ISA core 1314. The instruction converter 1312 is used to convert the first ISA binary code 1306 into code that may be natively executed by the processor without a first ISA core 1314. This converted code is not necessarily to be the same as the alternative ISA binary code 1310; however, the converted code will accomplish the general operation and be made up of instructions from the alternative ISA. Thus, the instruction converter 1312 represents software, firmware, hardware, or a combination thereof that, through emulation, simulation or any other process, allows a processor or other electronic device that does not have a first ISA processor or core to execute the first ISA binary code 1306.

Techniques and architectures for checksum-based fault detection and correction for matrix operations are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description

Additional Notes and Examples

Example 1 includes an apparatus, comprising memory and an input/output (IO) bus, wherein an address space of the memory and the IO bus is at least partially organized as a plurality of large pages, and wherein a large page is organized as two or more sub-pages, and circuitry coupled to the memory and the IO bus to map an IO address to a physical address, and track a modification to a large page at a granularity that corresponds to a size of a subset of the large page.

Example 2 includes the apparatus of Example 1, wherein the circuitry is further to selectively track the modification to the large page at a first granularity that corresponds to the size of the subset of the large page or a second granularity that corresponds to the size of the large page based on a configuration setting.

Example 3 includes the apparatus of Example 2, wherein the circuitry is further to determine the configuration setting based on a field of a register.

Example 4 includes the apparatus of any of Examples 1 to 3, wherein the circuitry is further to maintain a page table to map the IO address to the physical address, and maintain a shadow page table to track the modification to the large page at the granularity that corresponds to the size of the subset of the large page.

Example 5 includes the apparatus of Example 4, wherein the shadow page table is adjacent and physically contiguous to the page table.

Example 6 includes the apparatus of any of Examples 4 to 5, wherein the circuitry is further to set a value of a field in a page table entry of the shadow page table to indicate a modification to a sub-page of the large page.

Example 7 includes the apparatus of Example 6, wherein the field in the page table entry corresponds to a range of two or more sub-pages of the large page, wherein a size of the range corresponds to the size of the subset of the large page.

Example 8 includes the apparatus of any of Examples 4 to 7, wherein the circuitry is further to maintain a shadow pointer table with an entry to point to the shadow page table.

Example 9 includes the apparatus of Example 8, wherein the shadow pointer table is adjacent and physically contiguous to the page table.

Example 10 includes an apparatus, comprising memory, and an input/output memory management unit (IOMMU) coupled to the memory, the IOMMU including circuitry to manage access from input/output (IO) devices to the memory at a page level that includes at least a higher-level page and a lower-level page, wherein a higher-level page includes a plurality of lower-level pages, and selectively track higher-level dirty pages at a first granularity that corresponds to a first size of a higher-level page or at a second granularity that corresponds to a second size of a subset of the higher-level page.

Example 11 includes the apparatus of Example 10, further comprising a register to store an indication of whether the circuitry is to track higher-level dirty pages at the first granularity or the second granularity.

Example 12 includes the apparatus of Example 11, wherein the circuitry is further to determine if an IO device modifies a higher-level page, and set a dirty bit in a shadow higher-level page table entry that corresponds to a modified subset of the modified higher-level page if the register stores an indication that the circuitry is to track higher-level dirty pages at the second granularity.

Example 13 includes the apparatus of any of Examples 11 to 12, wherein the memory is to store a table with an indication of whether the first size of the higher-level page corresponds to a first large page size or a second large page size.

Example 14 includes the apparatus of Example 13, wherein, if the register stores an indication that the circuitry is to track higher-level dirty pages at the second granularity, the circuitry is further to utilize a shadow higher-level page structure that is adjacent to a higher-level page directory to store dirty bits that correspond to modified subsets of a higher-level page, if the table stores an indication of that the first size of the higher-level page corresponds to the first large page size.

Example 15 includes the apparatus of any of Examples 13 to 14, wherein, if the register stores an indication that the circuitry is to track higher-level dirty pages at the second granularity, the circuitry is further to utilize a first shadow higher-level page structure that is adjacent to a higher-level page directory to store pointers to respective second shadow higher-level page structures that store dirty bits that correspond to modified subsets of a higher-level page, if the table stores an indication of that the first size of the higher-level page corresponds to the second large page size.

Example 16 includes a system, comprising a processor, memory, a memory management unit (MMU) coupled between the processor and the memory, and an input/output (IO) MMU (IOMMU) coupled to the memory to manage access to the memory from one or more IO devices and to selectively track dirty large pages at one or more granularities including at least a first granularity that corresponds to a first size of a large page or at a second granularity that corresponds to a second size of a subset of the large page, wherein the large page includes two or more sub-pages.

Example 17 includes the system of Example 16, wherein the memory is to store a page table with an indication of whether the first size of the large page corresponds to a first large page size or a second large page size.

Example 18 includes the system of any of Examples 16 to 17, further comprising a configuration register to store a global indication of the one or more granularities to be tracked for the dirty large pages.

Example 19 includes the system of Example 18, further comprising non-transitory instructions that when executed by the processor cause the processor to determine if the configuration register stores an indication that the IOMMU is to track dirty large pages at the second granularity and, if so determined, to create a first set of page structures to be utilized by the IOMMU to manage the access to the memory from the one or more IO devices, and create a second set of shadow page structures to be utilized by the IOMMU to track dirty subsets of the large pages.

Example 20 includes the system of Example 19, wherein the IOMMU is further to set a dirty bit in a shadow page table entry of the second set of shadow page structures that corresponds to a modified subset of a modified large page.

Example 21 includes the system of any of Examples 16 to 20, further comprising non-transitory instructions that when executed by the processor cause the processor to migrate only subsets of the large pages indicated as dirty by the second set of shadow page structures, in response to a migration request.

Example 22 includes a method, comprising managing access from input/output (IO) devices to a memory at a page level that includes at least a higher-level page and a lower-level page, wherein a higher-level page includes a plurality of lower-level pages, and selectively tracking higher-level dirty pages at a first granularity that corresponds to a first size of a higher-level page or at a second granularity that corresponds to a second size of a subset of the higher-level page.

Example 23 includes the method of Example 22, further comprising storing an indication in a register of whether to track higher-level dirty pages at the first granularity or the second granularity.

Example 24 includes the method of Example 23, further comprising determining if an IO device modifies a higher-level page, and setting a dirty bit in a shadow higher-level page table entry that corresponds to a modified subset of the modified higher-level page if the register stores an indication to track higher-level dirty pages at the second granularity.

Example 25 includes the method of any of Examples 23 to 24, further comprising storing an indication in a table of whether the first size of the higher-level page corresponds to a first large page size or a second large page size.

Example 26 includes the method of Example 25, further comprising utilizing a shadow higher-level page structure that is adjacent to a higher-level page directory to store dirty bits that correspond to modified subsets of a higher-level page, if the register stores an indication to track higher-level dirty pages at the second granularity and the table stores an indication of that the first size of the higher-level page corresponds to the first large page size.

Example 27 includes the method of any of Examples 25 to 26, further comprising utilizing a first shadow higher-level page structure that is adjacent to a higher-level page directory to store pointers to respective second shadow higher-level page structures that store dirty bits that correspond to modified subsets of a higher-level page, if the register stores an indication to track higher-level dirty pages at the second granularity and the table stores an indication of that the first size of the higher-level page corresponds to the second large page size.

Example 28 includes the method of any of Examples 22 to 26, further comprising creating a first set of page structures to manage the access to the memory from the IO devices, and creating a second set of shadow page structures to track dirty subsets of the large pages if the register stores an indication to track higher-level dirty pages at the second granularity.

Example 29 includes the method of Examples 28, further comprising setting a dirty bit in a shadow page table entry of the second set of shadow page structures that corresponds to a modified subset of a modified higher-level page.

Example 30 includes the method of any of Examples 28 to 29, further comprising migrating only subsets of the higher-level pages indicated as dirty by the second set of shadow page structures, in response to a migration request.

Example 31 includes an apparatus, comprising means for managing access from input/output (IO) devices to a memory at a page level that includes at least a higher-level page and a lower-level page, wherein a higher-level page includes a plurality of lower-level pages, and means for selectively tracking higher-level dirty pages at a first granularity that corresponds to a first size of a higher-level page or at a second granularity that corresponds to a second size of a subset of the higher-level page.

Example 32 includes the apparatus of Example 31, further comprising means for storing an indication in a register of whether to track higher-level dirty pages at the first granularity or the second granularity.

Example 33 includes the apparatus of Example 32, further comprising means for determining if an IO device modifies a higher-level page, and means for setting a dirty bit in a shadow higher-level page table entry that corresponds to a modified subset of the modified higher-level page if the register stores an indication to track higher-level dirty pages at the second granularity.

Example 34 includes the apparatus of any of Examples 32 to 33, further comprising means for storing an indication in a table of whether the first size of the higher-level page corresponds to a first large page size or a second large page size.

Example 35 includes the apparatus of Example 34, further comprising means for utilizing a shadow higher-level page structure that is adjacent to a higher-level page directory to store dirty bits that correspond to modified subsets of a higher-level page, if the register stores an indication to track higher-level dirty pages at the second granularity and the table stores an indication of that the first size of the higher-level page corresponds to the first large page size.

Example 36 includes the apparatus of any of Examples 34 to 35, further comprising means for utilizing a first shadow higher-level page structure that is adjacent to a higher-level page directory to store pointers to respective second shadow higher-level page structures that store dirty bits that correspond to modified subsets of a higher-level page, if the register stores an indication to track higher-level dirty pages at the second granularity and the table stores an indication of that the first size of the higher-level page corresponds to the second large page size.

Example 37 includes the apparatus of any of Examples 31 to 35, further comprising means for creating a first set of page structures to manage the access to the memory from the IO devices, and means for creating a second set of shadow page structures to track dirty subsets of the large pages if the register stores an indication to track higher-level dirty pages at the second granularity.

Example 38 includes the apparatus of Examples 37, further comprising means for setting a dirty bit in a shadow page table entry of the second set of shadow page structures that corresponds to a modified subset of a modified higher-level page.

Example 39 includes the apparatus of any of Examples 37 to 38, further comprising means for migrating only subsets of the higher-level pages indicated as dirty by the second set of shadow page structures, in response to a migration request.

Example 40 includes at least one non-transitory one machine readable medium comprising a plurality of instructions that, in response to being executed on a computing device, cause the computing device to manage access from input/output (IO) devices to a memory at a page level that includes at least a second-stage page, wherein a second-stage page includes a plurality of sub-pages, and selectively track large dirty pages at a first granularity that corresponds to a first size of a second-stage page or at a second granularity that corresponds to a second size of a subset of the second-stage page.

Example 41 includes the at least one non-transitory one machine readable medium of Example 40, comprising a plurality of further instructions that, in response to being executed on the computing device, cause the computing device to store an indication in a register of whether to track second-stage dirty pages at the first granularity or the second granularity.

Example 42 includes the at least one non-transitory one machine readable medium of Example 41, comprising a plurality of further instructions that, in response to being executed on the computing device, cause the computing device to determine if an IO device modifies a second-stage page, and set a dirty bit in a shadow second-stage page table entry that corresponds to a modified subset of the modified second-stage page if the register stores an indication to track second-stage dirty pages at the second granularity.

Example 43 includes the at least one non-transitory one machine readable medium of any of Examples 40 to 42, comprising a plurality of further instructions that, in response to being executed on the computing device, cause the computing device to store an indication in a table of whether the first size of the second-stage page corresponds to a first second-stage page size or a second second-stage page size.

Example 44 includes the at least one non-transitory one machine readable medium of Example 43, comprising a plurality of further instructions that, in response to being executed on the computing device, cause the computing device to utilize a second-stage shadow page structure that is adjacent to a second-stage page directory to store dirty bits that correspond to modified subsets of a second-stage page, if the register stores an indication to track second-stage dirty pages at the second granularity and the table stores an indication of that the first size of the second-stage page corresponds to the first second-stage page size.

Example 45 includes the at least one non-transitory one machine readable medium of any of Examples 43 to 44, comprising a plurality of further instructions that, in response to being executed on the computing device, cause the computing device to utilize a first second-stage shadow page structure that is adjacent to a second-stage page directory to store pointers to respective second second-stage shadow page structures that store dirty bits that correspond to modified subsets of a second-stage page, if the register stores an indication to track second-stage dirty pages at the second granularity and the table stores an indication of that the first size of the second-stage page corresponds to the second second-stage page size.

Example 46 includes the at least one non-transitory one machine readable medium of any of Examples 40 to 45, comprising a plurality of further instructions that, in response to being executed on the computing device, cause the computing device to create a first set of page structures to manage the access to the memory from the IO devices, and create a second set of shadow page structures to track dirty subsets of the second-stage pages if the register stores an indication to track second-stage dirty pages at the second granularity.

Example 47 includes the at least one non-transitory one machine readable medium of Example 46, comprising a plurality of further instructions that, in response to being executed on the computing device, cause the computing device to set a dirty bit in a shadow page table entry of the second set of shadow page structures that corresponds to a modified subset of a modified second-stage page.

Example 48 includes the at least one non-transitory one machine readable medium of any of Examples 46 to 47, comprising a plurality of further instructions that, in response to being executed on the computing device, cause the computing device to migrate only subsets of the second-stage pages indicated as dirty by the second set of shadow page structures, in response to a migration request.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain examples also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMS, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain examples are not described with reference to any particular programming language. It will be appreciated that a variety of programming languages may be used to implement the teachings of such examples as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus, comprising:

memory and an input/output (IO) bus, wherein an address space of the memory and the IO bus is at least partially organized as a plurality of large pages, and wherein a large page is organized as two or more sub-pages; and an input/output memory management unit (IOMMU) coupled to the memory and the IO bus, the IOMMU comprising circuitry to:

map an IO address to a physical address; and track a modification to the large page at a granularity that corresponds to a size of a subset of the large page.

2. The apparatus of claim 1, wherein the circuitry is further to:

selectively track the modification to the large page at any of multiple granularities based on a configuration setting, the multiple granularities comprising:

a first granularity that corresponds to the size of the subset of the large page; and a second granularity that corresponds to the size of the large page.

3. The apparatus of claim 2, wherein the circuitry is further to:

determine the configuration setting based on a field of a register.

4. The apparatus of claim 1, wherein the circuitry is further to:

maintain a page table to map the IO address to the physical address; and maintain a shadow page table to track the modification to the large page at the granularity that corresponds to the size of the subset of the large page.

5. The apparatus of claim 4, wherein the shadow page table is adjacent and physically contiguous to the page table.

6. The apparatus of claim 4, wherein the circuitry is further to:

set a value of a field in a page table entry of the shadow page table to indicate a modification to a sub-page of the large page.

7. The apparatus of claim 6, wherein the field in the page table entry corresponds to a range of two or more sub-pages of the large page, wherein a size of the range corresponds to the size of the subset of the large page.

8. The apparatus of claim 4, wherein the circuitry is further to:

maintain a shadow pointer table with an entry to point to the shadow page table.

9. The apparatus of claim 8, wherein the shadow pointer table is adjacent and physically contiguous to the page table.

10. An apparatus, comprising:

memory; and an input/output memory management unit (IOMMU) coupled to the memory, the IOMMU including circuitry to:

manage access from input/output (IO) devices to the memory at a page level that includes at a higher-level page and a lower-level page, wherein a higher-level page includes a plurality of lower-level pages, and selectively track higher-level dirty pages at any of multiple granularities comprising:

a first granularity that corresponds to a first size of a higher-level page; and a second granularity that corresponds to a second size of a subset of the higher-level page.

11. The apparatus of claim 10, further comprising:

a register to store an indication of whether the circuitry is to track higher-level dirty pages at the first granularity or the second granularity.

12. The apparatus of claim 11, wherein the circuitry is further to:

determine if an IO device modifies a higher-level page; and set a dirty bit in a shadow higher-level page table entry that corresponds to a modified subset of the higher-level page if the register stores an indication that the circuitry is to track higher-level dirty pages at the second granularity.

13. The apparatus of claim 11, wherein the memory is to store a table with an indication of whether the first size of the higher-level page corresponds to a first large page size or a second large page size.

14. The apparatus of claim 13, wherein, if the register stores an indication that the circuitry is to track higher-level dirty pages at the second granularity, the circuitry is further to:

utilize a shadow higher-level page structure that is adjacent to a higher-level page directory to store dirty bits that correspond to modified subsets of a higher-level page, if the table stores an indication that the first size of the higher-level page corresponds to the first large page size.

15. The apparatus of claim 13, wherein, if the register stores an indication that the circuitry is to track higher-level dirty pages at the second granularity, the circuitry is further to:

utilize a first shadow higher-level page structure that is adjacent to a higher-level page directory to store pointers to respective second shadow higher-level page structures that store dirty bits that correspond to modified subsets of a higher-level page, if the table stores an indication that the first size of the higher-level page corresponds to the second large page size.

16. A system, comprising:

a processor;

memory;

a memory management unit (MMU) coupled between the processor and the memory; and an input/output (IO) MMU (IOMMU) coupled to the memory to manage access to the memory from one or more IO devices and to selectively track dirty large pages at any of multiple granularities comprising:

a first granularity that corresponds to a first size of a large page; and a second granularity that corresponds to a second size of a subset of the large page, wherein the large page includes two or more sub-pages.

17. The system of claim 16, wherein the memory is to store a page table with an indication of whether the first size of the large page corresponds to a first large page size or a second large page size.

18. The system of claim 16, further comprising:

a configuration register to store a global indication of one or more granularities to be tracked for the dirty large pages.

19. The system of claim 18, further comprising non-transitory instructions that when executed by the processor cause the processor to determine if the configuration register stores an indication that the IOMMU is to track dirty large pages at the second granularity and, if so determined, to:

create a first set of page structures to be utilized by the IOMMU to manage the access to the memory from the one or more IO devices; and create a second set of shadow page structures to be utilized by the IOMMU to track dirty subsets of the dirty large pages.

20. The system of claim 19, wherein the IOMMU is further to:

set a dirty bit in a shadow page table entry of the second set of shadow page structures that corresponds to a modified subset of a modified large page.

21. The system of claim 19, further comprising non-transitory instructions that when executed by the processor cause the processor to:

migrate only subsets of large pages indicated as dirty by the second set of shadow page structures, in response to a migration request.

* * * * *